US010172077B2

(12) United States Patent
Luo et al.

(10) Patent No.: US 10,172,077 B2
(45) Date of Patent: *Jan. 1, 2019

(54) TRANSMISSION AND RECEPTION OF DISCOVERY SIGNALS OVER A RADIO FREQUENCY SPECTRUM BAND

(71) Applicant: QUALCOMM Incorporated, San Diego, CA (US)

(72) Inventors: Tao Luo, San Diego, CA (US); Yongbin Wei, La Jolla, CA (US); Peter Gaal, San Diego, CA (US); Durga Prasad Malladi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/426,160

(22) Filed: Feb. 7, 2017

(65) Prior Publication Data

US 2017/0150430 A1    May 25, 2017

Related U.S. Application Data

(63) Continuation of application No. 14/813,474, filed on Jul. 30, 2015, now Pat. No. 9,602,322.

(Continued)

(51) Int. Cl.
*H04L 27/26* (2006.01)
*H04W 48/16* (2009.01)
(Continued)

(52) U.S. Cl.
CPC .......... *H04W 48/16* (2013.01); *H04L 5/0048* (2013.01); *H04L 25/0238* (2013.01);
(Continued)

(58) Field of Classification Search
CPC ............... H04L 27/2622; H04L 5/0048; H04L 27/2601; H04L 25/0238; H04W 56/0015;
(Continued)

(56) References Cited

U.S. PATENT DOCUMENTS 8,995,592 B2 * 3/2015 Dao .................. H04J 11/004
375/316
2009/0052361 A1 * 2/2009 Cai ..................... H04L 1/18
370/311

(Continued)

FOREIGN PATENT DOCUMENTS

| EP | 2693819 A1 | 2/2014 |
| GB | 2496383 A | 5/2013 |
| WO | WO-2013155253 A1 | 10/2013 |

OTHER PUBLICATIONS

ISA/EP, International Search Report and Written Opinion of the International Searching Authority, Int'l Application No. PCT/US2015/043124, dated Oct. 28, 2015, European Patent Office, Rijswijk, NL, 17 pgs.

*Primary Examiner* — Syed Haider
(74) *Attorney, Agent, or Firm* — Holland & Hart LLP

(57) ABSTRACT

Techniques are described for wireless communication. A first method includes receiving a first orthogonal frequency division multiplexing (OFDM) symbol including a plurality of reference signals (RSs) over a radio frequency spectrum band. The first method may also include receiving a second OFDM symbol including a first synchronization signal over the radio frequency spectrum band. A second method includes transmitting a first OFDM symbol including a plurality of RSs over an radio frequency spectrum band. The second method may also include transmitting a second OFDM symbol including a first synchronization signal over the radio frequency spectrum band. In each method, a first portion of the first OFDM symbol includes a higher density (Continued)

of the RSs than a remaining portion of the first OFDM symbol, and when included, the second OFDM symbol may be adjacent in time to the first OFDM symbol.

60 Claims, 20 Drawing Sheets

Related U.S. Application Data

(60) Provisional application No. 62/032,448, filed on Aug. 1, 2014.

(51) Int. Cl.
*H04L 5/00* (2006.01)
*H04W 56/00* (2009.01)
*H04W 24/10* (2009.01)
*H04W 72/04* (2009.01)
*H04W 16/14* (2009.01)
*H04W 52/02* (2009.01)
*H04L 25/02* (2006.01)

(52) U.S. Cl.
CPC ......... *H04L 27/2662* (2013.01); *H04W 16/14* (2013.01); *H04W 24/10* (2013.01); *H04W 52/0274* (2013.01); *H04W 56/0015* (2013.01); *H04W 72/042* (2013.01); *H04W 72/0453* (2013.01); *H04L 27/2601* (2013.01); *Y02D 70/1242* (2018.01); *Y02D 70/1262* (2018.01); *Y02D 70/1264* (2018.01); *Y02D 70/142* (2018.01); *Y02D 70/146* (2018.01)

(58) Field of Classification Search
CPC ............. H04W 52/0274; H04W 24/10; H04W 72/0453; H04W 16/14; H04W 48/16; H04W 72/042; Y02D 70/1262; Y02D 70/1242; Y02D 70/142; Y02D 70/1264; Y02D 70/146
See application file for complete search history.

(56) References Cited

U.S. PATENT DOCUMENTS

| | | | |
|---|---|---|---|
| 2011/0110254 A1* | 5/2011 | Ji | H04W 36/0066 370/252 |
| 2011/0261781 A1 | 10/2011 | Vrzic et al. | |
| 2013/0265945 A1 | 10/2013 | He et al. | |
| 2013/0272262 A1* | 10/2013 | Li | H04W 28/02 370/330 |
| 2014/0177547 A1 | 6/2014 | Guo et al. | |
| 2014/0314072 A1* | 10/2014 | Awad | H04L 5/001 370/350 |
| 2014/0321414 A1* | 10/2014 | Chun | H04L 5/0023 370/329 |
| 2015/0230211 A1 | 8/2015 | You et al. | |
| 2015/0381331 A1 | 12/2015 | Kim et al. | |
| 2016/0036617 A1 | 2/2016 | Luo et al. | |
| 2016/0308637 A1* | 10/2016 | Frenne | H04J 11/0069 |

* cited by examiner

1500

Receiving a first orthogonal frequency division multiplexing (OFDM) symbol including a plurality of reference signals (RSs) over a radio frequency spectrum band, wherein a first portion of the first OFDM symbol includes a higher density of the RSs than a remaining portion of the first OFDM symbol — 1505

Transmitting a first orthogonal frequency division multiplexing (OFDM) symbol including a plurality of reference signals (RSs) over a radio frequency spectrum band, wherein a first portion of the first OFDM symbol includes a higher density of the RSs than a remaining portion of the first OFDM symbol — 1705

TRANSMISSION AND RECEPTION OF DISCOVERY SIGNALS OVER A RADIO FREQUENCY SPECTRUM BAND

CROSS REFERENCES

The present application for patent is a continuation of U.S. patent application Ser. No. 14/813,474 by Luo et al., entitled "Transmission and Reception of Discovery Signals Over a Radio Frequency Spectrum Band", filed Jul. 30, 2015 and claims priority to U.S. Provisional Patent Application No. 62/032,448 by Luo et al., entitled "Transmission and Reception of Discovery Signals Over a Radio Frequency Spectrum Band," filed Aug. 1, 2014, assigned to the assignee hereof.

FIELD OF THE DISCLOSURE

The present disclosure, for example, relates to wireless communication systems, and more particularly to techniques for transmitting and receiving discovery signals over a radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). In some instances, discovery signals (e.g., reference signals and/or synchronization signals) may be transmitted from a base station to a UE. When received by a UE, the discovery signals may enable the UE to discover and/or synchronize to a base station.

Some modes of communication may enable communications between a base station and a UE over an unlicensed radio frequency spectrum band, or over different radio frequency spectrum bands (e.g., a licensed radio frequency spectrum band and/or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity.

SUMMARY

The present disclosure, for example, relates to one or more techniques for transmitting and receiving discovery signals over a radio frequency spectrum band. Prior to gaining access to, and communicating over, an unlicensed radio frequency spectrum band, a base station may perform a clear channel assessment (CCA) to determine whether a channel of the unlicensed radio frequency spectrum band is available. When it is determined that the channel of the unlicensed radio frequency spectrum band is not available (e.g., because another device is already using the channel of the unlicensed radio frequency spectrum band), the base station may not transmit over the unlicensed radio frequency spectrum band and may perform another CCA, at a later time, to contend for access to the unlicensed radio frequency spectrum band at the later time. Uncertainty therefore exists as to when the base station will be able to transmit over the unlicensed radio frequency spectrum band. Also, there may be radio frames in which the base station has no data to transmit to a UE over the channel of the unlicensed radio frequency spectrum band. Because both of these factors tend to reduce the frequency at which a base station is able to transmit discovery signals, which discovery signals may be useful to a UE that is attempting to discover and/or synchronize to a base station, methods and apparatus that enable more regular and/or robust transmission of discovery signals may be useful. Methods and apparatus that may improve a UE's ability to make narrow band measurements may also be useful.

In a first set of illustrative examples, a method for wireless communication is described. In one configuration, the method may include receiving a first orthogonal frequency division multiplexing (OFDM) symbol including a plurality of reference signals (RSs), which may be cell-specific reference signals (CRSs) or channel state information reference signals (CSI-RSs), over a radio frequency spectrum band. A first portion of the first OFDM symbol may include a higher density of the RSs than a remaining portion of the first OFDM symbol.

In some examples, the method may include receiving a second OFDM symbol including a first synchronization signal over the radio frequency spectrum band. In some examples, the second OFDM symbol may be adjacent in time to the first OFDM symbol.

In some examples, the method may include receiving a third OFDM symbol including a second synchronization signal over the radio frequency spectrum band. In some examples, the third OFDM symbol may be adjacent in time to the second OFDM symbol. In some examples, the method may include receiving a fourth OFDM symbol including a plurality of RSs over the radio frequency spectrum band. A first portion of the fourth OFDM symbol may include a higher density of RSs than a remaining portion of the fourth OFDM symbol. In some examples, the fourth OFDM symbol may be adjacent in time to the third OFDM symbol.

In some examples of the method, the radio frequency spectrum band may include an unlicensed radio frequency spectrum band. In some examples of the method, each of the second OFDM symbol and the third OFDM symbol may further include at least one of a group consisting of: a channel state information reference signal (CSI-RS), a service information block (SIB), a physical broadcast channel (PBCH), and combinations thereof. In some examples of the method, the first synchronization signal may include a secondary synchronization signal and the second synchronization signal may include a primary synchronization signal. In some examples of the method, the first synchronization signal and the second synchronization signal may be received over a central set of resource blocks of the second OFDM symbol and the third OFDM symbol.

In some examples of the method, the first portion of the first OFDM symbol may include a central set of resource blocks of a component carrier of the radio frequency spectrum band. In some examples, the method may include performing a narrow band channel measurement on the central set of resource blocks, where the measurement can be based on all of the RSs from the plurality of RSs, or a subset of RSs from the plurality of RSs.

In some examples, the method may include performing a blind detection on the first OFDM symbol to determine whether the OFDM symbol comprises a transmission from a base station. In some examples, the method may include performing a blind detection of a remaining amount of downlink traffic in a subframe, and selectively powering down a receiver based at least in part on the blind detection. In some examples, the blind detection may be based at least in part on a first plurality of CSI-RSs received in the second OFDM symbol. In some examples, the blind detection may be further based at least in part on a second plurality of CSI-RSs received in an OFDM symbols associated with a second synchronization signal. In some examples, the method may include measuring a symbol energy, and the blind detection may be based at least in part on the measured symbol energy.

In some examples of the method, the first portion of the first OFDM symbol may be associated with a plurality of subcarriers and a RS may be received over each of the subcarriers of the first OFDM symbol.

In a second set of illustrative examples, an apparatus for wireless communication is described. In one configuration, the apparatus may include means for receiving a first OFDM symbol including a plurality of RSs, which may be CRSs or CSI-RSs, over a radio frequency spectrum band. A first portion of the first OFDM symbol may include a higher density of the RSs than a remaining portion of the first OFDM symbol. In some examples, the apparatus may further include means for implementing one or more aspects of the method for wireless communication described above with respect to the first set of illustrative examples.

In a third set of illustrative examples, another apparatus for wireless communication is described. In one configuration, the apparatus may include a processor, and memory coupled to the processor. The processor may be configured to receive a first OFDM symbol including a plurality of RSs, which may be CRSs or CSI-RSs, over a radio frequency spectrum band. A first portion of the first OFDM symbol may include a higher density of the RSs than a remaining portion of the first OFDM symbol. In some examples, the processor may also be configured to implement one or more aspects of the method for wireless communication described above with respect to the first set of illustrative examples.

In a fourth set of illustrative examples, a computer-readable medium for storing instructions executable by a processor is described. In one configuration, the computer-readable medium may include instructions to receive a first OFDM symbol including a plurality of RSs, which may be CRSs or CSI-RSs, over a radio frequency spectrum band. A first portion of the first OFDM symbol may include a higher density of the RSs than a remaining portion of the first OFDM symbol. In some examples, the computer-readable medium may also include instructions to implement one or more aspects of the method for wireless communication described above with respect to the first set of illustrative examples.

In a fifth set of illustrative examples, another method for wireless communication is described. In one configuration, the method may include transmitting a first OFDM symbol including a plurality of RSs, which may be CRSs or CSI-RSs, over a radio frequency spectrum band. A first portion of the first OFDM symbol may include a higher density of the RSs than a remaining portion of the first OFDM symbol.

In some examples, and the method may include transmitting a second OFDM symbol including a first synchronization signal over the radio frequency spectrum band. In some examples, the second OFDM symbol may be adjacent in time to the first OFDM symbol. In some examples, the method may include transmitting a third OFDM symbol including a second synchronization signal over the radio frequency spectrum band. In some examples, the third OFDM symbol may be adjacent in time to the second OFDM symbol. In some examples, the method may include transmitting a fourth OFDM symbol including a plurality of RSs over the radio frequency spectrum band. A first portion of the fourth OFDM symbol may include a higher density of RSs than a remaining portion of the fourth OFDM symbol. In some examples, the fourth OFDM symbol may be adjacent in time to the third OFDM symbol.

In some examples of the method, the radio frequency spectrum band may include an unlicensed radio frequency spectrum band. In some examples of the method, each of the second OFDM symbol and the third OFDM symbol may further include at least one of a group consisting of: a CSI-RS, a SIB, a PBCH, and combinations thereof. In some examples of the method, the first synchronization signal may include a secondary synchronization signal and the second synchronization signal may include a primary synchronization signal. In some examples of the method, the first synchronization signal and the second synchronization signal may be transmitted over a central set of resource blocks of the second OFDM symbol and the third OFDM symbol.

In some examples of the method, the first portion of the first OFDM symbol may include a central set of resource blocks of a component carrier of the radio frequency spectrum band. In some examples of the method, the first portion of the first OFDM symbol may be associated with a plurality of subcarriers and the RS may be transmitted over each of the subcarriers of the first OFDM symbol.

In a sixth set of illustrative examples, another apparatus for wireless communication is described. In one configuration, the apparatus may include means for transmitting a first OFDM symbol including a plurality of RSs, which may be CRSs or CSI-RSs, over a radio frequency spectrum band. A first portion of the first OFDM symbol may include a higher density of the RSs than a remaining portion of the first OFDM symbol. In some examples, the apparatus may further include means for implementing one or more aspects of the method for wireless communication described above with respect to the fifth set of illustrative examples.

In a seventh set of illustrative examples, another apparatus for wireless communication is described. In one configuration, the apparatus may include a processor, and memory coupled to the processor. The processor may be configured to transmit a first OFDM symbol including a plurality of RSs, which may be CRSs or CSI-RSs, over a radio frequency spectrum band. A first portion of the first OFDM symbol may include a higher density of the RSs than a remaining portion of the first OFDM symbol. In some examples, the processor may also be configured to implement one or more aspects of the method for wireless communication described above with respect to the fifth set of illustrative examples.

In an eighth set of illustrative examples, another computer-readable medium for storing instructions executable by a processor is described. In one configuration, the computer-readable medium may include instructions to transmit a first OFDM symbol including a plurality of RSs, which may be CRSs or CSI-RSs, over a radio frequency spectrum band. A first portion of the first OFDM symbol may include a higher density of the RSs than a remaining portion of the first OFDM symbol. In some examples, the computer-readable medium may also include instructions to implement one or more aspects of the method for wireless communication described above with respect to the fifth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 15A is a flow chart illustrating an example of a method for wireless communication, in accordance with various aspects of the present disclosure;

FIG. 17A is a flow chart illustrating an example of a method for wireless communication, in accordance with various aspects of the present disclosure.

DETAILED DESCRIPTION

Figure 1:
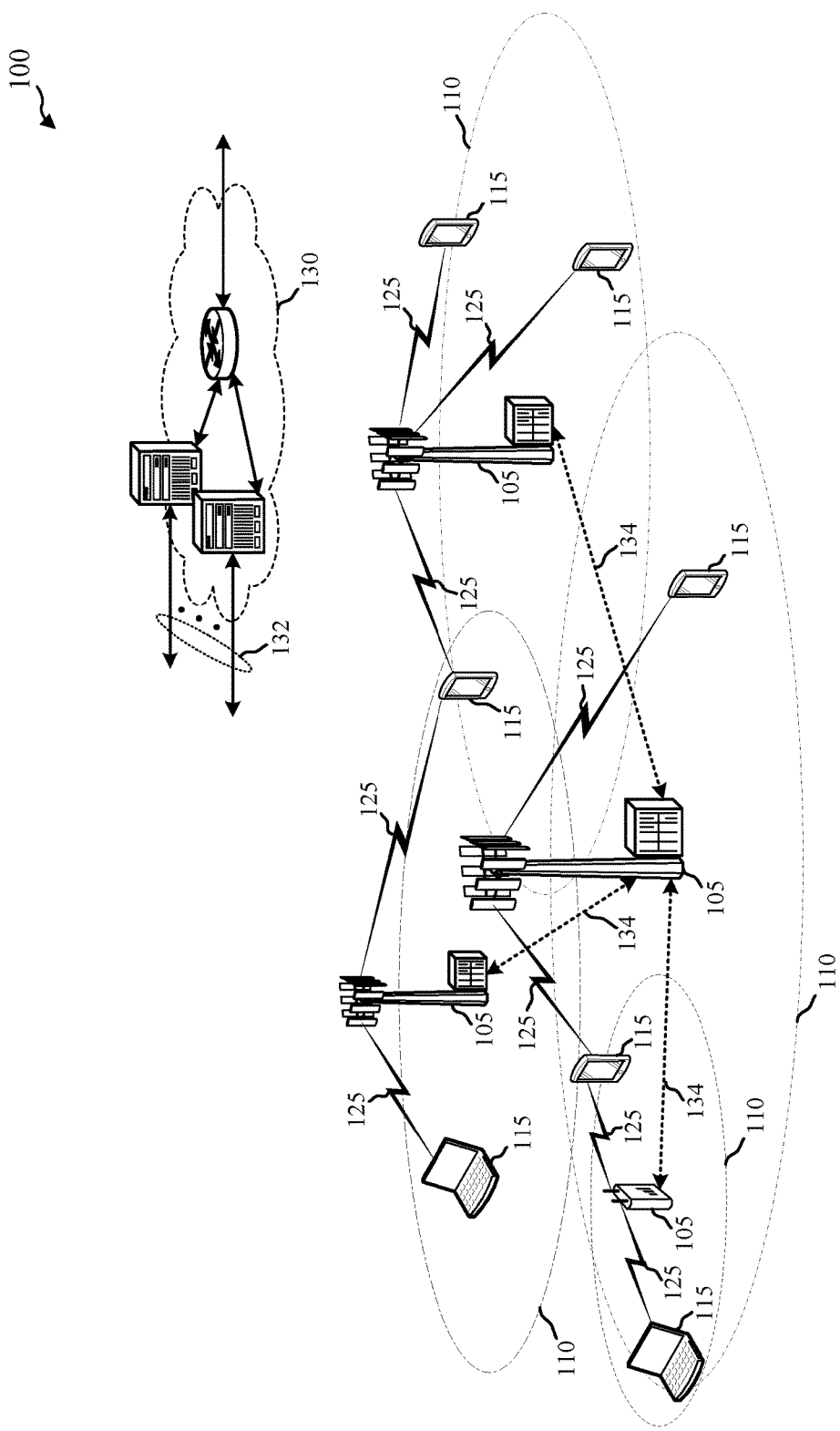
FIG. 1 illustrates an example of a wireless communication system, in accordance with various aspects of the disclosure.

Techniques are described in which a radio frequency spectrum band, such as an unlicensed radio frequency spectrum band, is used for at least a portion of communications over a wireless communication system. In some examples, the radio frequency spectrum band may be used for Long Term Evolution (LTE) communications and/or LTE-Advanced (LTE-A) communications. In examples in which the radio frequency spectrum band is an unlicensed radio frequency spectrum band, the unlicensed radio frequency spectrum band may be used in combination with, or independent from, a licensed radio frequency spectrum band. In some examples, the unlicensed radio frequency spectrum band may be a radio frequency spectrum band for which a device may need to contend for access because the radio frequency spectrum band is available, at least in part, for unlicensed use, such as Wi-Fi use.

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) and/or a coordinated set of base stations defining a cellular network, such as an LTE/LTE-A network) with opportunities for enhanced data transmission capacity. As noted above, before communicating over the unlicensed radio frequency spectrum band, devices may perform a CCA procedure (or extended CCA procedure) to determine whether a channel of the unlicensed radio frequency spectrum band is available. When it is determined that a channel is not available, a CCA procedure (or extended CCA procedure) may be performed for the channel again at a later time. Uncertainty therefore exists as to when the base station will be able to transmit over the unlicensed radio frequency spectrum band. Also, there may be radio frames in which the base station has no data to transmit to a UE over the channel of the unlicensed radio frequency spectrum band. Because both of these factors tend to reduce the frequency at which a base station is able to transmit discovery signals, which discovery signals may be useful to a UE that is attempting to discover and/or synchronize to a base station, methods and apparatus that enable more regular and/or robust transmission of discovery signals may be useful.

In some examples, the techniques described herein may increase the likelihood that discovery signals are received by UEs by having a base station contend for access to a channel of an unlicensed radio frequency spectrum band and, when the base station successfully contends for access to the channel, having the base station transmit discovery signals over the channel of the unlicensed radio frequency spectrum band. A UE may detect the discovery signals and then, upon detecting an absence of further traffic over the channel, selectively power down a receiver of the UE. In some examples, the techniques described herein may also or alternatively format (e.g., arrange) the transmission of discovery signals so they are more likely to be received and decoded by UEs. In some examples, the techniques described herein may also or alternatively improve a UE's ability to make narrow band measurements.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro and/or small cell base stations). There may be overlapping geographic coverage areas 110 for different technologies.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, and/or uplink (UL) transmissions from a UE 115 to a base station 105. The downlink transmissions may also be called forward link transmissions, while the uplink transmissions may also be called reverse link transmissions. In some examples, DL transmissions may include transmissions of discovery signals, including, for example, reference signals and/or synchronization signals.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

Each carrier may be provided over a licensed radio frequency spectrum band or an unlicensed radio frequency spectrum band, and a set of carriers used in a particular mode of communication may all be received (e.g., at a UE 115) over the licensed radio frequency spectrum band, all be received (e.g., at a UE 115) over the unlicensed radio frequency spectrum band, or be received (e.g., at a UE 115) over a combination of the licensed radio frequency spectrum band and the unlicensed radio frequency spectrum band.

In some embodiments of the wireless communication system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to the unlicensed radio frequency spectrum band, a carrier aggregation mode in which both LTE/LTE-A downlink and uplink communications may be offloaded from the licensed radio frequency spectrum band to the unlicensed radio frequency spectrum band, and/or a standalone mode in which LTE/LTE-A downlink and uplink communications between a base station 105 and a UE 115 may take place in the unlicensed radio frequency spectrum band. Base stations 105 as well as UEs 115 may in some examples support one or more of these or similar modes of operation. In some examples, OFDMA waveforms may be used in the communication links 125 for LTE/LTE-A downlink communications in the licensed radio frequency spectrum band and/or the unlicensed radio frequency spectrum band, while OFDMA, SC-FDMA and/or resource block interleaved FDMA waveforms may be used in the communication links 125 for LTE/LTE-A uplink communications in the licensed radio frequency spectrum band and/or the unlicensed radio frequency spectrum band.

Figure 2:
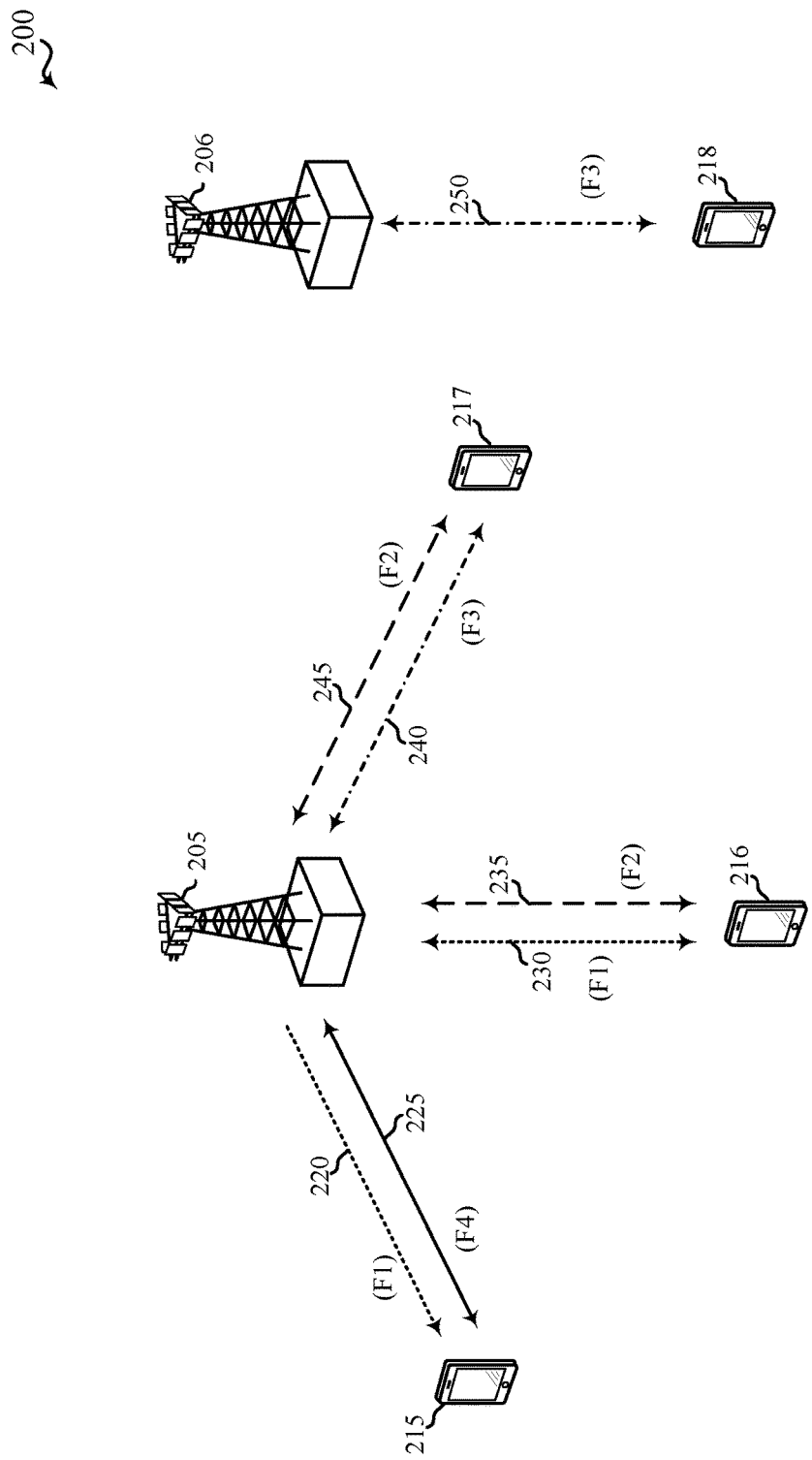
FIG. 2 shows a wireless communication system in which LTE/LTE-A may be deployed under different scenarios using an unlicensed radio frequency spectrum band, in accordance with various aspects of the present disclosure.

FIG. 2 shows a wireless communication system 200 in which LTE/LTE-A may be deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 206 may be examples of aspects of one or more of the base stations 105 described with reference to FIG. 1, while a first UE 215, a second UE 216, a third UE 217, and a fourth UE 218 may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic and/or signaling congestion.

In one example of a carrier aggregation mode in the wireless communication system 200, the first base station 205 may transmit OFDMA waveforms to the second UE 216 using a second bidirectional link 230 and may receive OFDMA waveforms, SC-FDMA waveforms, and/or resource block interleaved FDMA waveforms from the second UE 216 using the second bidirectional link 230. The second bidirectional link 230 may be associated with the frequency F1 in the unlicensed radio frequency spectrum band. The first base station 205 may also transmit OFDMA waveforms to the second UE 216 using a third bidirectional link 235 and may receive SC-FDMA waveforms from the second UE 216 using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic and/or signaling congestion.

In another example of a carrier aggregation mode in the wireless communication system 200, the first base station 205 may transmit OFDMA waveforms to the third UE 217 using a fourth bidirectional link 240 and may receive OFDMA waveforms, SC-FDMA waveforms, and/or resource block interleaved waveforms from the third UE 217 using the fourth bidirectional link 240. The fourth bidirectional link 240 may be associated with a frequency F3 in the unlicensed radio frequency spectrum band. The first base station 205 may also transmit OFDMA waveforms to the third UE 217 using a fifth bidirectional link 245 and may receive SC-FDMA waveforms from the third UE 217 using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 206 may transmit OFDMA waveforms to the fourth UE 218 using a bidirectional link 250 and may receive OFDMA waveforms, SC-FDMA waveforms, and/or resource block interleaved FDMA waveforms from the fourth UE 218 using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, and/or 206 described with reference to FIGS. 1 and/or 2, and/or one of the UEs 115, 215, 216, 217, and/or 218 described with reference to FIGS. 1 and/or 2, may use a gating interval to gain access to a channel of an unlicensed radio frequency spectrum band (e.g., to a physical channel of the unlicensed radio frequency spectrum band). The gating interval may define the application of a contention-based protocol, such as a Listen Before Talk (LBT) protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure, such as a clear channel assessment (CCA) procedure. The outcome of the CCA procedure may indicate to the transmitting device whether a channel of an unlicensed radio frequency spectrum band is available or in use for the gating interval (also referred to as an LBT radio frame or a CCA frame). When a CCA procedure indicates that the channel is available (e.g., "clear" for use) for a corresponding LBT radio frame, the transmitting apparatus may reserve and/or use the channel of the unlicensed radio frequency spectrum band during part or all of the LBT radio frame. When the CCA procedure indicates that the channel is not available (e.g., that the channel is in use or reserved by another apparatus), the transmitting apparatus may be prevented from using the channel during the LBT radio frame.

In some examples, it may be useful for a transmitting apparatus to generate a gating interval for an unlicensed radio frequency spectrum band on a periodic basis and synchronize at least one boundary of the gating interval with at least one boundary of a periodic interval. For example, it may be useful to generate a periodic gating interval for a cellular downlink in a shared radio frequency spectrum band, and to synchronize at least one boundary of the periodic gating interval with at least one boundary of a periodic interval (e.g., a periodic LTE/LTE-A radio interval) associated with the cellular downlink. Examples of such synchronization are shown in FIG. 3.

Figure 3:
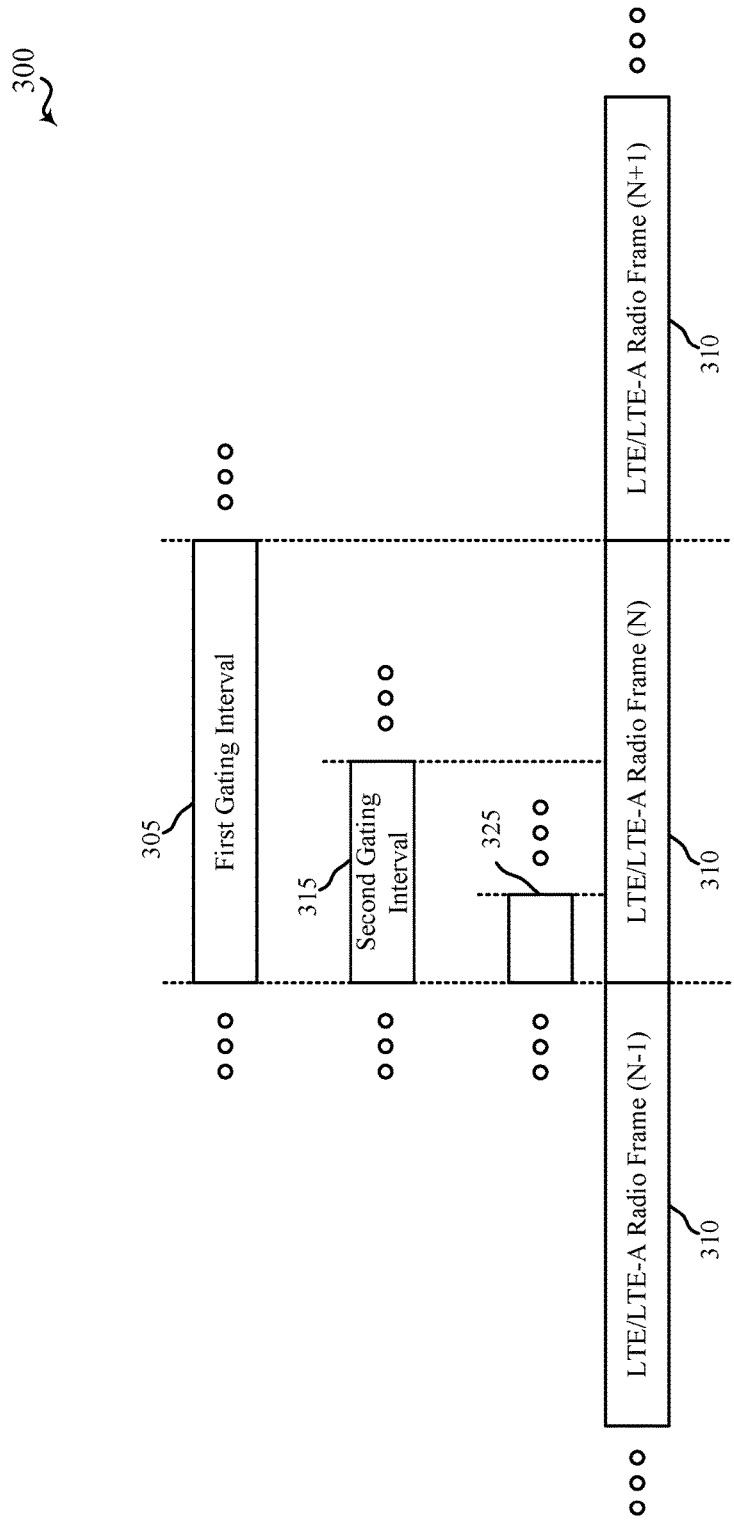
FIG. 3 shows an example of a wireless communication over an unlicensed radio frequency spectrum band, in accordance with various aspects of the present disclosure.

FIG. 3 shows examples 300 of a gating interval (or LBT radio frame) for a cellular downlink in an unlicensed radio frequency spectrum band, in accordance with various aspects of the present disclosure. A first gating interval 305, a second gating interval 315, and/or a third gating interval 325 may be used as a periodic gating interval by an eNB or UE that supports transmissions over the unlicensed radio frequency spectrum band. Examples of such an eNB may include the base stations 105, 205, and/or 206 described with reference to FIGS. 1 and/or 2, and examples of such a UE may include the UEs 115, 215, 216, 217, and/or 218 described with reference to FIGS. 1 and/or 2. The first gating interval 305, the second gating interval 315, and/or the third gating interval 325 may in some examples be used with the wireless communication system 100 and/or 200 described with reference to FIGS. 1 and/or 2.

By way of example, the duration of the first gating interval 305 is shown to be equal to (or approximately equal to) a duration of an LTE/LTE-A radio frame 310 of a periodic interval associated with a cellular downlink. In some examples, "approximately equal" means the duration of the first gating interval 305 is within a cyclic prefix (CP) duration of the duration of the periodic interval.

At least one boundary (e.g., start time or end time) of the first gating interval 305 may be synchronized with at least one boundary of the periodic interval that includes the LTE/LTE-A radio frames N−1 to N+1. In some cases, the first gating interval 305 may have boundaries that are aligned with the frame boundaries of the periodic interval. In other cases, the first gating interval 305 may have boundaries that are synchronized with, but offset from, the frame boundaries of the periodic interval. For example, the boundaries of the first gating interval 305 may be aligned with subframe boundaries of the periodic interval, or with subframe midpoint boundaries (e.g., the midpoints of particular subframes) of the periodic interval.

In some cases, the periodic interval may coincide with LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of the second gating interval 315 and the third gating interval 325 are shown to be sub-multiples of (or approximate sub-multiples of) the duration of the periodic interval associated with the cellular downlink. In some examples, an "approximate sub-multiple of" means the duration of the second gating interval 315 and/or the third gating interval 325 is within a cyclic prefix (CP) duration of the duration of a sub-multiple of (e.g., half or one-fifth) the periodic interval. For example, the second gating interval 315 may have a duration of five milliseconds and the third gating interval 325 may have a duration of two milliseconds. The second gating interval 315 or the third gating interval 325 may be advantageous over the first gating interval 305 because its shorter duration may facilitate more frequent sharing of a shared radio frequency spectrum band.

Figure 4:
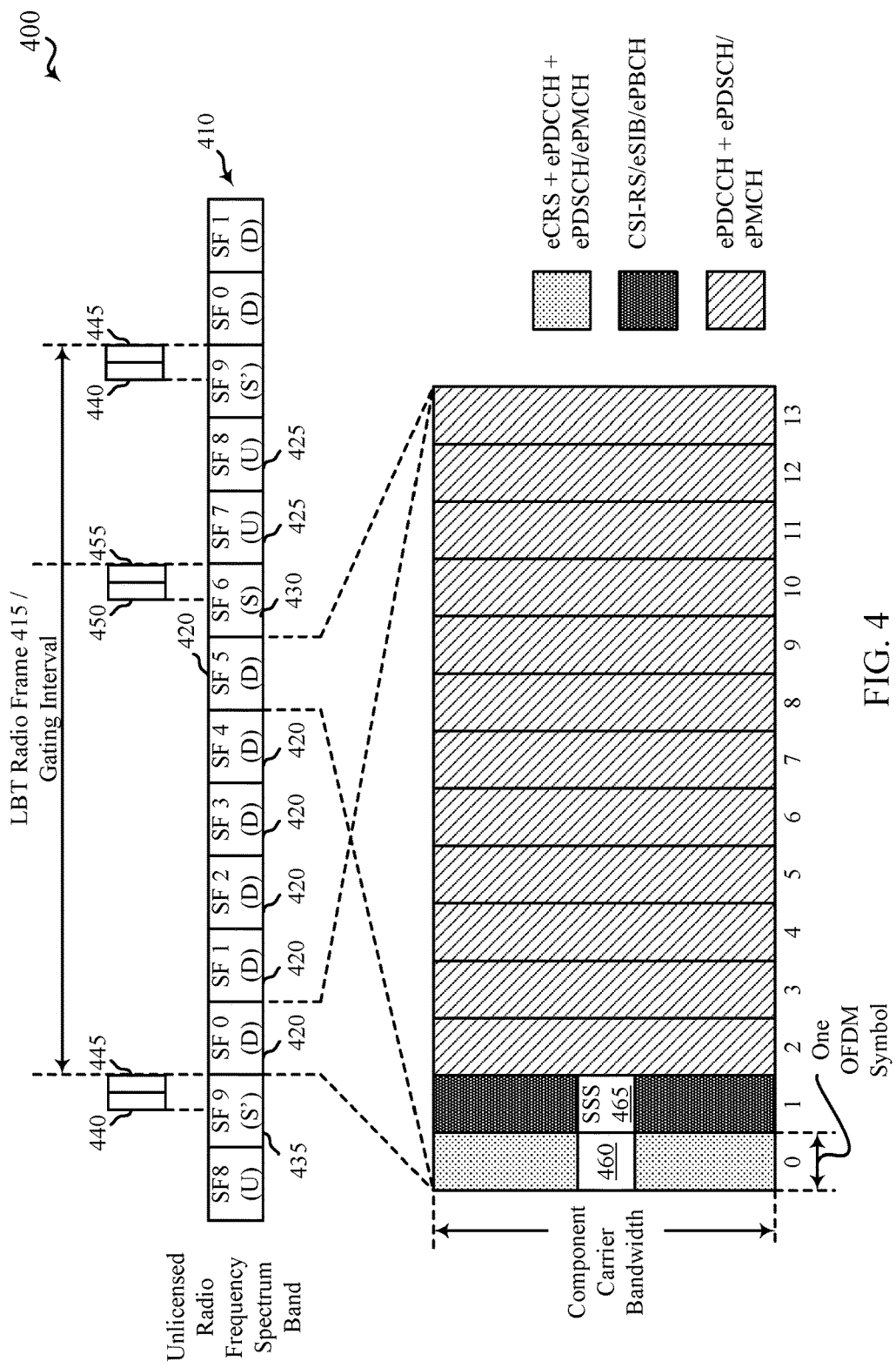
FIG. 4 shows an example of a wireless communication over an unlicensed radio frequency spectrum band, in accordance with various aspects of the present disclosure.

FIG. 4 shows an example 400 of a wireless communication 410 over an unlicensed radio frequency spectrum band, in accordance with various aspects of the present disclosure. In some examples, the unlicensed radio frequency spectrum band may include a radio frequency spectrum band for which apparatuses may need to contend for access because the radio frequency spectrum band is available for unlicensed use, such as Wi-Fi use. In an alternative to what is shown in FIG. 4, the unlicensed radio frequency spectrum band may be any radio frequency spectrum band.

As shown in FIG. 4, an LBT radio frame 415, which may correspond to a gating interval such as the first gating interval 305 described with reference to FIG. 3, may have a duration of ten milliseconds and include a number of downlink (D) subframes 420, a number of uplink (U) subframes 425, and two types of special subframes, an S subframe 430 and an S' subframe 435. The S subframe 430 may provide a transition between downlink subframes 420 and uplink subframes 425, while the S' subframe 435 may provide a transition between uplink subframes 425 and downlink subframes 420. During the S' subframe 435, a CCA 440 (e.g., a downlink CCA) may be performed by one or more base stations, such as one or more of the base stations 105, 205, and/or 206 described with reference to FIGS. 1 and/or 2, to reserve, for a period of time, a channel (e.g., a component carrier) over which the wireless communication 410 occurs. In some examples, the CCA may be a CCA performed for a base station operating in accord with an LBT frame-based equipment (LBT-FBE) protocol, in which successful contention to the unlicensed radio frequency spectrum band depends on the a single CCA. During the S subframe 430, a CCA 450 (e.g., an uplink CCA) may be performed by one or more UEs, such as one or more of the UEs 115, 215, 216, 217, and/or 218 described with reference to FIGS. 1 and/or 2, to reserve, for a period of time, the channel (e.g., the component carrier) over which the wireless communication 410 occurs.

Following a successful CCA 440 by a base station, the base station may transmit a channel usage indicator (e.g., a channel usage beacon signal (CUBS)) 445 over the unlicensed radio frequency spectrum band, to provide an indication to other base stations, UEs, and/or apparatuses (e.g., wireless devices, Wi-Fi access points, etc.) that the base station has reserved the channel. The channel usage indicator 445 may not only reserve the channel for transmissions by the base station, but for uplink transmissions by its UEs. The channel usage indicator 445 may also provide signals for automatic gain control (AGC) and tracking loop updates by wireless devices, before the base station transmits data to the wireless devices. In some examples, a channel usage indicator 445 may be transmitted using a plurality of interleaved resource blocks. Transmitting a channel usage indicator 445 in this manner may enable the channel usage indicator 445 to occupy at least a certain percentage of the available frequency bandwidth in the unlicensed radio frequency spectrum band and satisfy one or more regulatory requirements (e.g., a requirement that the channel usage indicator 445 occupy at least 80% of the available frequency bandwidth). The channel usage indicator 445 may in some examples take a form similar to that of an LTE/LTE-A cell-specific reference signal (CRS) and/or channel state information reference signal (CSI-RS). When the CCA 440 fails, the channel usage indicator 445 and a subsequent downlink transmission are not transmitted. Following a successful CCA 450 by a UE, the UE may transmit a channel usage indicator (e.g., a CUBS) 455 over the unlicensed radio frequency spectrum band, to provide an indication to other UEs, base stations, and/or apparatuses (e.g., wireless devices, Wi-Fi access points, etc.) that the UE has reserved the channel.

When a CCA 440 or CCA 450 is successful, a number of discovery signals (e.g., reference symbols and/or synchronization signals) may be transmitted by the base station or UE that performed the successful CCA. The reference signals and/or synchronization signals may be transmitted over the unlicensed radio frequency spectrum band. In some examples, the reference signals and/or synchronization signals may be transmitted in one or more OFDM symbols of one or more subframes. In some examples, the reference signals and/or synchronization signals transmitted following a successful CCA 440 may be transmitted in a first subframe (e.g., SF 0) and/or a sixth subframe (e.g., SF 5) of the LBT radio frame 415.

As shown in FIG. 4, the first subframe and/or the sixth subframe of the LBT radio frame 415 may include a plurality of OFDM symbols (e.g., fourteen OFDM symbols, numbered 0 through 13).

A first OFDM symbol (e.g., OFDM symbol 0) that may be transmitted/received in the first subframe and/or the sixth subframe of the LBT radio frame 415 may include a plurality of RSs, which may be cell-specific reference signals (CRSs) or channel state information reference signals (CSI-RSs). A first portion 460 of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion 460 of the first OFDM symbol may include a central set of resource blocks of a component carrier of the unlicensed radio frequency spectrum band (e.g., a center six resource blocks of a component carrier having 100 resource blocks, in which each resource block includes twelve subcarriers). In some examples, the first portion 460 of the first OFDM symbol may be associated with a plurality of subcarriers (e.g., a central set of subcarriers of a component carrier of the unlicensed radio frequency spectrum band). In some examples, a RS may be received over each of the subcarriers of the first OFDM symbol. In some examples, the plurality of RSs may include a plurality of enhanced or evolved CRSs (eCRSs).

A second OFDM symbol (e.g., OFDM symbol 1) that may be transmitted/received in the first subframe and/or the sixth subframe of the LBT radio frame 415 may include a first synchronization signal 465. In some examples, the first synchronization signal 465 may be associated with a central set of resource blocks of a component carrier of the unlicensed radio frequency spectrum band (e.g., a center six resource blocks of a component carrier having 100 resource blocks, in which each resource block includes twelve subcarriers). In some examples, the first synchronization signal 465 may be associated with a plurality of subcarriers (e.g., a central set of subcarriers of a component carrier of the unlicensed radio frequency spectrum band).

In some examples, the first synchronization signal 465 may be received over the same antenna port as the plurality of RSs. In some examples, the first OFDM symbol may further include at least one of a Physical Downlink Control Channel (PDCCH), a Physical Downlink Shared Channel (PDSCH), and/or a Physical Multicast Channel (PMCH). In some examples, the PDCCH may include an enhanced or evolved PDCCH (ePDCCH), the PDSCH may include an enhanced or evolved PDSCH (ePDSCH), and/or the PMCH may include an enhanced or evolved PMCH (ePMCH). In some examples, the second OFDM symbol may further include at least one of a CSI-RS, a SIB, a PBCH, or a combination thereof. In some examples, the SIB may include an eSIB and/or the PBCH may include an enhanced or evolved PBCH (ePBCH). In some examples, an RS or embedded user equipment-specific reference signal (UE-RS) may provide a phase reference for the PBCH.

In some examples of the method, a PDCCH, a PDSCH, and/or a PMCH may be received during one or more of the third OFDM symbol (e.g., OFDM symbol 2) through the fourteenth OFDM symbol (e.g., OFDM symbol 13). In some examples, the PDCCH may include an ePDCCH, the PDSCH may include an ePDSCH, and/or the PMCH may include an ePMCH. In some examples, the eighth OFDM symbol (e.g., OFDM symbol 7) may be configured similarly to the first OFDM symbol.

In some examples, a UE may synchronize with a base station based at least in part on the received first synchronization signal 465.

Figure 5:
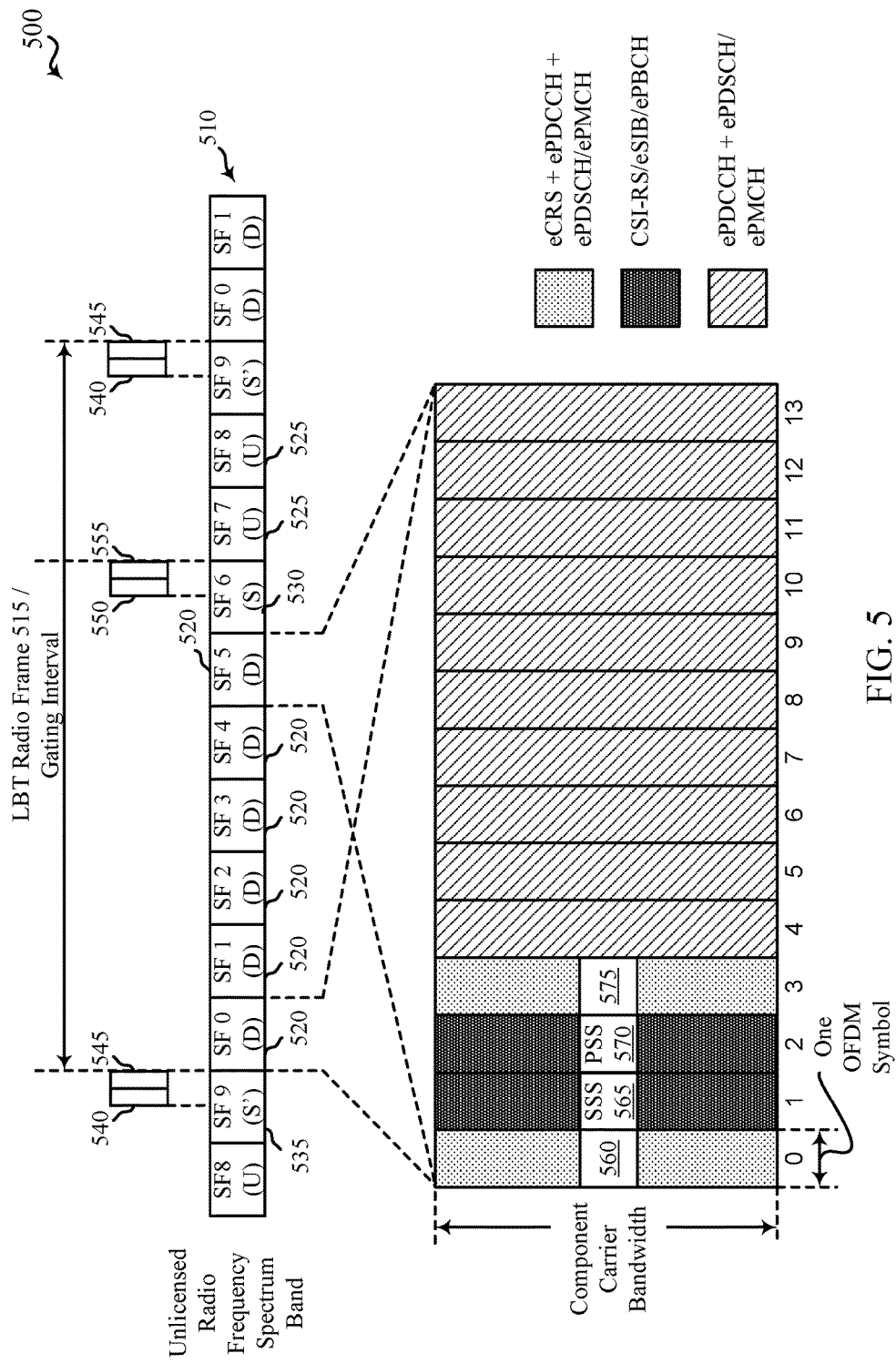
FIG. 5 shows an example of a wireless communication over an unlicensed radio frequency spectrum band, in accordance with various aspects of the present disclosure.

FIG. 5 shows an example 500 of a wireless communication 510 over an unlicensed radio frequency spectrum band, in accordance with various aspects of the present disclosure. In some examples, the unlicensed radio frequency spectrum band may include a radio frequency spectrum band for which apparatuses may need to contend for access because the radio frequency spectrum band is available for unlicensed use, such as Wi-Fi use. In an alternative to what is shown in FIG. 5, the unlicensed radio frequency spectrum band may be any radio frequency spectrum band.

As shown in FIG. 5, an LBT radio frame 515, which may correspond to a gating interval such as the first gating interval 305 described with reference to FIG. 3, may have a duration of ten milliseconds and include a number of downlink (D) subframes 520, a number of uplink (U) subframes 525, and two types of special subframes, an S subframe 530 and an S' subframe 535. The S subframe 530 may provide a transition between downlink subframes 520 and uplink subframes 525, while the S' subframe 535 may provide a transition between uplink subframes 525 and downlink subframes 520. During the S' subframe 535, a CCA 540 (e.g., a downlink CCA) may be performed by one or more base stations, such as one or more of the base stations 105, 205, and/or 206 described with reference to FIGS. 1 and/or 2, to reserve, for a period of time, a channel (e.g., a component carrier) over which the wireless communication 510 occurs. In some examples, the CCA may be a CCA performed for a base station operating in accord with an LBT frame-based equipment (LBT-FBE) protocol, in which successful contention to the unlicensed radio frequency spectrum band depends on the a single CCA. During the S subframe 530, a CCA 550 (e.g., an uplink CCA) may be performed by one or more UEs, such as one or more of the UEs 115, 215, 216, 217, and/or 218 described with reference to FIGS. 1 and/or 2, to reserve, for a period of time, the channel (e.g., the component carrier) over which the wireless communication 510 occurs.

Following a successful CCA 540 by a base station, the base station may transmit a channel usage indicator (e.g., a channel usage beacon signal (CUBS)) 545 over the unlicensed radio frequency spectrum band, to provide an indication to other base stations, UEs, and/or apparatuses (e.g., wireless devices, Wi-Fi access points, etc.) that the base station has reserved the channel. The channel usage indicator 545 may not only reserve the channel for transmissions by the base station, but for uplink transmissions by its UEs. The channel usage indicator 545 may also provide signals for automatic gain control (AGC) and tracking loop updates by wireless devices, before the base station transmits data to the wireless devices. In some examples, a channel usage indicator 545 may be transmitted using a plurality of interleaved resource blocks. Transmitting a channel usage indicator 545 in this manner may enable the channel usage indicator 545 to occupy at least a certain percentage of the available frequency bandwidth in the unlicensed radio frequency spectrum band and satisfy one or more regulatory requirements (e.g., a requirement that the channel usage indicator 545 occupy at least 80% of the available frequency bandwidth). The channel usage indicator 545 may in some examples take a form similar to that of an LTE/LTE-A cell-specific reference signal (CRS) and/or channel state information reference signal (CSI-RS). When the CCA 540 fails, the channel usage indicator 545 and a subsequent downlink transmission are not transmitted. Following a successful CCA 550 by a UE, the UE may transmit a channel usage indicator (e.g., a CUBS) 555 over the unlicensed radio frequency spectrum band, to provide an indication to other UEs, base stations, and/or apparatuses (e.g., wireless devices, Wi-Fi access points, etc.) that the UE has reserved the channel.

When a CCA 540 or CCA 550 is successful, a number of discovery signals (e.g., reference symbols and/or synchronization signals) may be transmitted by the base station or UE that performed the successful CCA. The reference signals and/or synchronization signals may be transmitted over the unlicensed radio frequency spectrum band. In some examples, the reference signals and/or synchronization signals may be transmitted in one or more OFDM symbols of one or more subframes. In some examples, the reference signals and/or synchronization signals transmitted following a successful CCA 540 may be transmitted in a first subframe (e.g., SF 0) and/or a sixth subframe (e.g., SF 5) of the LBT radio frame 515.

As shown in FIG. 5, the first subframe and/or the sixth subframe of the LBT radio frame 515 may include a plurality of OFDM symbols (e.g., fourteen OFDM symbols, numbered 0 through 13).

A first OFDM symbol (e.g., OFDM symbol 0) that may be transmitted/received in the first subframe and/or the sixth subframe of the LBT radio frame 515 may include a plurality of RSs, which may be cell-specific reference signals (CRSs) or channel state information reference signals (CSI-RSs). A first portion 560 of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion 560 of the first OFDM symbol may include a central set of resource blocks of a component carrier of the unlicensed radio frequency spectrum band (e.g., a center six resource blocks of a component carrier having 100 resource blocks, in which each resource block includes twelve subcarriers). In some examples, the first portion 560 of the first OFDM symbol may be associated with a plurality of subcarriers (e.g., a central set of subcarriers of a component carrier of the unlicensed radio frequency spectrum band). In some examples, a RS may be received over each of the subcarriers of the first OFDM symbol. In some examples, the plurality of RSs may include a plurality of eCRSs.

A second OFDM symbol (e.g., OFDM symbol 1) that may be transmitted/received in the first subframe and/or the sixth subframe of the LBT radio frame 515 may include a first synchronization signal 565. In some examples, the first synchronization signal 565 may be associated with a central set of resource blocks of a component carrier of the unlicensed radio frequency spectrum band (e.g., a center six resource blocks of a component carrier having 100 resource blocks, in which each resource block includes twelve subcarriers). In some examples, the first synchronization signal 565 may be associated with a plurality of subcarriers (e.g., a central set of subcarriers of a component carrier of the unlicensed radio frequency spectrum band). In some examples, the first synchronization signal 565 may include a secondary synchronization signal (SSS). In some examples, the SSS may include an enhanced or evolved SSS (eSSS).

A third OFDM symbol (e.g., OFDM symbol 2) that may be transmitted/received in the first subframe and/or the sixth subframe of the LBT radio frame 515 may include a second synchronization signal 570. In some examples, the second synchronization signal 570 may be associated with a central set of resource blocks of a component carrier of the unlicensed radio frequency spectrum band (e.g., a center six resource blocks of a component carrier having 100 resource blocks, in which each resource block includes twelve subcarriers). In some examples, the second synchronization signal 570 may be associated with a plurality of subcarriers (e.g., a central set of subcarriers of a component carrier of the unlicensed radio frequency spectrum band). In some examples, the second synchronization signal 570 may include a primary synchronization signal (PSS). In some examples, the PSS may include an enhanced or evolved PSS (ePSS).

A fourth OFDM symbol (e.g., OFDM symbol 3) that may be transmitted/received in the first subframe and/or the sixth subframe of the LBT radio frame 515 may include a plurality of RSs, which may be cell-specific reference signals (CRSs) or channel state information reference signals (CSI-RSs). A first portion 575 of the fourth OFDM symbol may include a higher density of RSs than a remaining portion of the fourth OFDM symbol. In some examples, the first portion 575 of the fourth OFDM symbol may include a central set of resource blocks of a component carrier of the unlicensed radio frequency spectrum band (e.g., a center six resource blocks of a component carrier having 100 resource blocks, in which each resource block includes twelve subcarriers). In some examples, the first portion 575 of the first OFDM symbol may be associated with a plurality of subcarriers (e.g., a central set of subcarriers of a component carrier of the unlicensed radio frequency spectrum band). In some examples, an RS may be received over each of the subcarriers of the first OFDM symbol. In some examples, the resource blocks and/or subcarriers included in the first portion 560 of the first OFDM symbol may be the same resource blocks and/or subcarriers included in the first portion 575 of the fourth OFDM symbol. In some examples, the plurality of RSs may include a plurality of eCRSs.

In some examples, the first synchronization signal 565 and the second synchronization signal 570 may be received over the same antenna port. In some examples, the first synchronization signal 565 and/or the second synchronization signal 570 may be received over the same antenna port as the plurality of RSs. In some examples, the first OFDM symbol and/or the fourth OFDM symbol may further include at least one of a PDCCH, a PDSCH, and/or a PMCH. In some examples, the PDCCH may include an ePDCCH, the PDSCH may include an ePDSCH, and/or the PMCH may include an ePMCH. In some examples, the second OFDM symbol and/or the third OFDM symbol may further include at least one of a CSI-RS, a SIB, a PBCH, or a combination thereof. In some examples, the SIB may include an eSIB and/or the PBCH may include an ePBCH. In some examples, an RS or embedded user equipment-specific reference signal (UE-RS) may provide a phase reference for the PBCH.

In some examples of the method, a PDCCH, a PDSCH, and/or a PMCH may be received during one or more of the fifth OFDM symbol (e.g., OFDM symbol 4) through the fourteenth OFDM symbol (e.g., OFDM symbol 13). In some examples, the PDCCH may include an ePDCCH, the PDSCH may include an ePDSCH, and/or the PMCH may include an ePMCH. In some examples, the eighth OFDM symbol (e.g., OFDM symbol 7) and the eleventh OFDM symbol (e.g., OFDM symbol 10) may be configured similarly to the first OFDM symbol and the fourth OFDM symbol.

In some examples, a UE may synchronize with a base station based at least in part on the received first synchronization signal 565 and/or the second synchronization signal 570. In some examples, the synchronizing may include performing a cross-correlation of samples of the first synchronization signal 565 and the second synchronization signal 570, and recovering a timing of the base station based at least in part on the cross-correlation of the samples.

Figure 6:
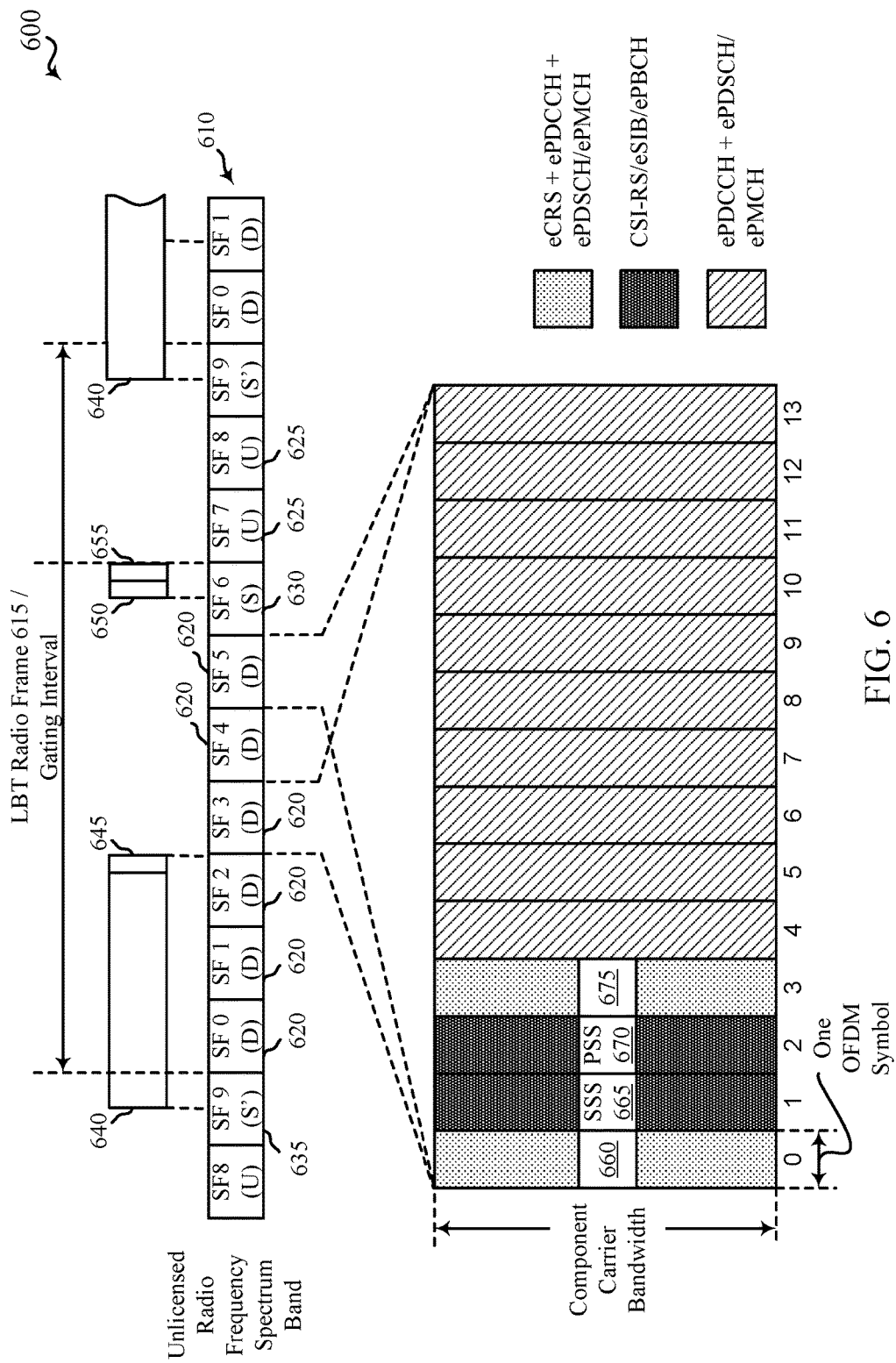
FIG. 6 shows an example of a wireless communication over an unlicensed radio frequency spectrum band, in accordance with various aspects of the present disclosure.

FIG. 6 shows an example 600 of a wireless communication 610 over an unlicensed radio frequency spectrum band, in accordance with various aspects of the present disclosure. In some examples, the unlicensed radio frequency spectrum band may include a radio frequency spectrum band for which apparatuses may need to contend for access because the radio frequency spectrum band is available for unlicensed use, such as Wi-Fi use. In an alternative to what is shown in FIG. 6, the unlicensed radio frequency spectrum band may be any radio frequency spectrum band.

As shown in FIG. 6, an LBT radio frame 615, which may correspond to a gating interval such as the first gating interval 305 described with reference to FIG. 3, may have a duration of ten milliseconds and include a number of downlink (D) subframes 620, a number of uplink (U) subframes 625, and two types of special subframes, an S subframe 630 and an S' subframe 635. The S subframe 630 may provide a transition between downlink subframes 620 and uplink subframes 625, while the S' subframe 635 may provide a transition between uplink subframes 625 and downlink subframes 620. During the S' subframe 635, a CCA 640 (e.g., a downlink CCA) may be performed by one or more base stations, such as one or more of the base stations 105, 205, and/or 206 described with reference to FIGS. 1 and/or 2, to reserve, for a period of time, a channel (e.g., a component carrier) over which the wireless communication 610 occurs. In some examples, the CCA 640 may be part of an extended CCA (ECCA) performed for a base station operating in accord with an LBT load-based equipment (LBT-LBE) protocol, in which successful contention to the unlicensed radio frequency spectrum band depends on the performance of a plurality of N CCAs. During the S subframe 630, a CCA 650 (e.g., an uplink CCA) may be performed by one or more UEs, such as one or more of the UEs 115, 215, 216, 217, and/or 218 described with reference to FIGS. 1 and/or 2, to reserve, for a period of time, the channel (e.g., the component carrier) over which the wireless communication 610 occurs.

Following a successful CCA 640 by a base station, the base station may transmit a channel usage indicator (e.g., a channel usage beacon signal (CUBS)) 645 over the unlicensed radio frequency spectrum band, to provide an indication to other base stations, UEs, and/or apparatuses (e.g., wireless devices, Wi-Fi access points, etc.) that the base station has reserved the channel. The channel usage indicator 645 may not only reserve the channel for transmissions by the base station, but for uplink transmissions by its UEs. The channel usage indicator 645 may also provide signals for automatic gain control (AGC) and tracking loop updates by wireless devices, before the base station transmits data to the wireless devices. In some examples, a channel usage indicator 645 may be transmitted using a plurality of interleaved resource blocks. Transmitting a channel usage indicator 645 in this manner may enable the channel usage indicator 645 to occupy at least a certain percentage of the available frequency bandwidth in the unlicensed radio frequency spectrum band and satisfy one or more regulatory requirements (e.g., a requirement that the channel usage indicator 645 occupy at least 80% of the available frequency bandwidth). The channel usage indicator 645 may in some examples take a form similar to that of an LTE/LTE-A cell-specific reference signal (CRS) and/or channel state information reference signal (CSI-RS). When the CCA 640 fails, the channel usage indicator 645 and a subsequent downlink transmission are not transmitted. Following a successful CCA 650 by a UE, the UE may transmit a channel usage indicator (e.g., a CUBS) 655 over the unlicensed radio frequency spectrum band, to provide an indication to other UEs, base stations, and/or apparatuses (e.g., wireless devices, Wi-Fi access points, etc.) that the UE has reserved the channel.

By way of example, FIG. 6 illustrates an ECCA that succeeds during subframe SF 2. When a CCA 640 is successful, a number of discovery signals (e.g., reference symbols and/or synchronization signals) may be transmitted by the base station or UE that performed the successful CCA. The reference signals and/or synchronization signals may be transmitted over the unlicensed radio frequency spectrum band. In some examples, the reference signals and/or synchronization signals may be transmitted in one or more OFDM symbols of one or more subframes. In some examples, the reference signals and/or synchronization signals transmitted following a successful CCA 640 may be transmitted in a first subframe following the successful CCA (e.g., SF 3 in FIG. 7) and/or a sixth subframe (e.g., SF 5) of the LBT radio frame 615.

As shown in FIG. 6, the first subframe following the successful CCA 640 (e.g., the fourth subframe, SF 3) and/or the sixth subframe, SF 5 of the LBT radio frame 615 may include a plurality of OFDM symbols (e.g., fourteen OFDM symbols, numbered 0 through 13).

A first OFDM symbol (e.g., OFDM symbol 0) that may be transmitted/received in the first subframe following the successful CCA and/or the sixth subframe of the LBT radio frame 615 may include a plurality of RSs, which may be cell-specific reference signals (CRSs) or channel state information reference signals (CSI-RSs). A first portion 660 of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion 660 of the first OFDM symbol may include a central set of resource blocks of a component carrier of the unlicensed radio frequency spectrum band (e.g., a center six resource blocks of a component carrier having 100 resource blocks, in which each resource block includes twelve subcarriers). In some examples, the first portion 660 of the first OFDM symbol may be associated with a plurality of subcarriers (e.g., a central set of subcarriers of a component carrier of the unlicensed radio frequency spectrum band). In some examples, a RS may be received over each of the subcarriers of the first OFDM symbol. In some examples, the plurality of RSs may include a plurality of eCRSs.

A second OFDM symbol (e.g., OFDM symbol 1) that may be transmitted/received in the first subframe following the successful CCA and/or the sixth subframe of the LBT radio frame 615 may include a first synchronization signal 665. In some examples, the first synchronization signal 665 may be associated with a central set of resource blocks of a component carrier of the unlicensed radio frequency spectrum band (e.g., a center six resource blocks of a component carrier having 100 resource blocks, in which each resource block includes twelve subcarriers). In some examples, the first synchronization signal 665 may be associated with a plurality of subcarriers (e.g., a central set of subcarriers of a component carrier of the unlicensed radio frequency spectrum band). In some examples, the first synchronization signal 665 may include an SSS. In some examples, the SSS may include an eSSS.

A third OFDM symbol (e.g., OFDM symbol 2) that may be transmitted/received in the first subframe following the successful CCA and/or the sixth subframe of the LBT radio frame 615 may include a second synchronization signal 670. In some examples, the second synchronization signal 670 may be associated with a central set of resource blocks of a component carrier of the unlicensed radio frequency spectrum band (e.g., a center six resource blocks of a component carrier having 100 resource blocks, in which each resource block includes twelve subcarriers). In some examples, the second synchronization signal 670 may be associated with a plurality of subcarriers (e.g., a central set of subcarriers of a component carrier of the unlicensed radio frequency spectrum band). In some examples, the second synchronization signal 670 may include a PSS. In some examples, the PSS may include an ePSS.

A fourth OFDM symbol (e.g., OFDM symbol 3) that may be transmitted/received in the first subframe following the successful CCA and/or the sixth subframe of the LBT radio frame 615 may include a plurality of RSs, which may be cell-specific reference signals (CRSs) or channel state information reference signals (CSI-RSs). A first portion 675 of the fourth OFDM symbol may include a higher density of RSs than a remaining portion of the fourth OFDM symbol. In some examples, the first portion 675 of the fourth OFDM symbol may include a central set of resource blocks of a component carrier of the unlicensed radio frequency spectrum band (e.g., a center six resource blocks of a component carrier having 100 resource blocks, in which each resource block includes twelve subcarriers). In some examples, the first portion 675 of the first OFDM symbol may be associated with a plurality of subcarriers (e.g., a central set of subcarriers of a component carrier of the unlicensed radio frequency spectrum band). In some examples, an RS may be received over each of the subcarriers of the first OFDM symbol. In some examples, the resource blocks and/or subcarriers included in the first portion 660 of the first OFDM symbol may be the same resource blocks and/or subcarriers included in the first portion 675 of the fourth OFDM symbol. In some examples, the plurality of RSs may include a plurality of eCRSs.

In some examples, the first synchronization signal 665 and the second synchronization signal 670 may be received over the same antenna port. In some examples, the first synchronization signal 665 and/or the second synchronization signal 670 may be received over the same antenna port as the plurality of RSs. In some examples, the first OFDM symbol and/or the fourth OFDM symbol may further include at least one of a PDCCH, a PDSCH, and/or a PMCH. In some examples, the PDCCH may include an ePDCCH, the PDSCH may include an ePDSCH, and/or the PMCH may include an ePMCH. In some examples, the second OFDM symbol and/or the third OFDM symbol may further include at least one of a CSI-RS, a SIB, a PBCH, or a combination thereof. In some examples, the SIB may include an eSIB and/or the PBCH may include an ePBCH. In some examples, an RS or embedded user equipment-specific reference signal (UE-RS) may provide a phase reference for the PBCH.

In some examples of the method, a PDCCH, a PDSCH, and/or a PMCH may be received during one or more of the fifth OFDM symbol (e.g., OFDM symbol 4) through the fourteenth OFDM symbol (e.g., OFDM symbol 13). In some examples, the PDCCH may include an ePDCCH, the PDSCH may include an ePDSCH, and/or the PMCH may include an ePMCH. In some examples, the eighth OFDM symbol (e.g., OFDM symbol 7) and the eleventh OFDM symbol (e.g., OFDM symbol 10) may be configured similarly to the first OFDM symbol and the fourth OFDM symbol.

In some examples, a UE may synchronize with a base station based at least in part on the received first synchronization signal 665 and/or the second synchronization signal 670. In some examples, the synchronizing may include performing a cross-correlation of samples of the first synchronization signal 665 and the second synchronization signal 670, and recovering a timing of the base station based at least in part on the cross-correlation of the samples.

Figure 7:
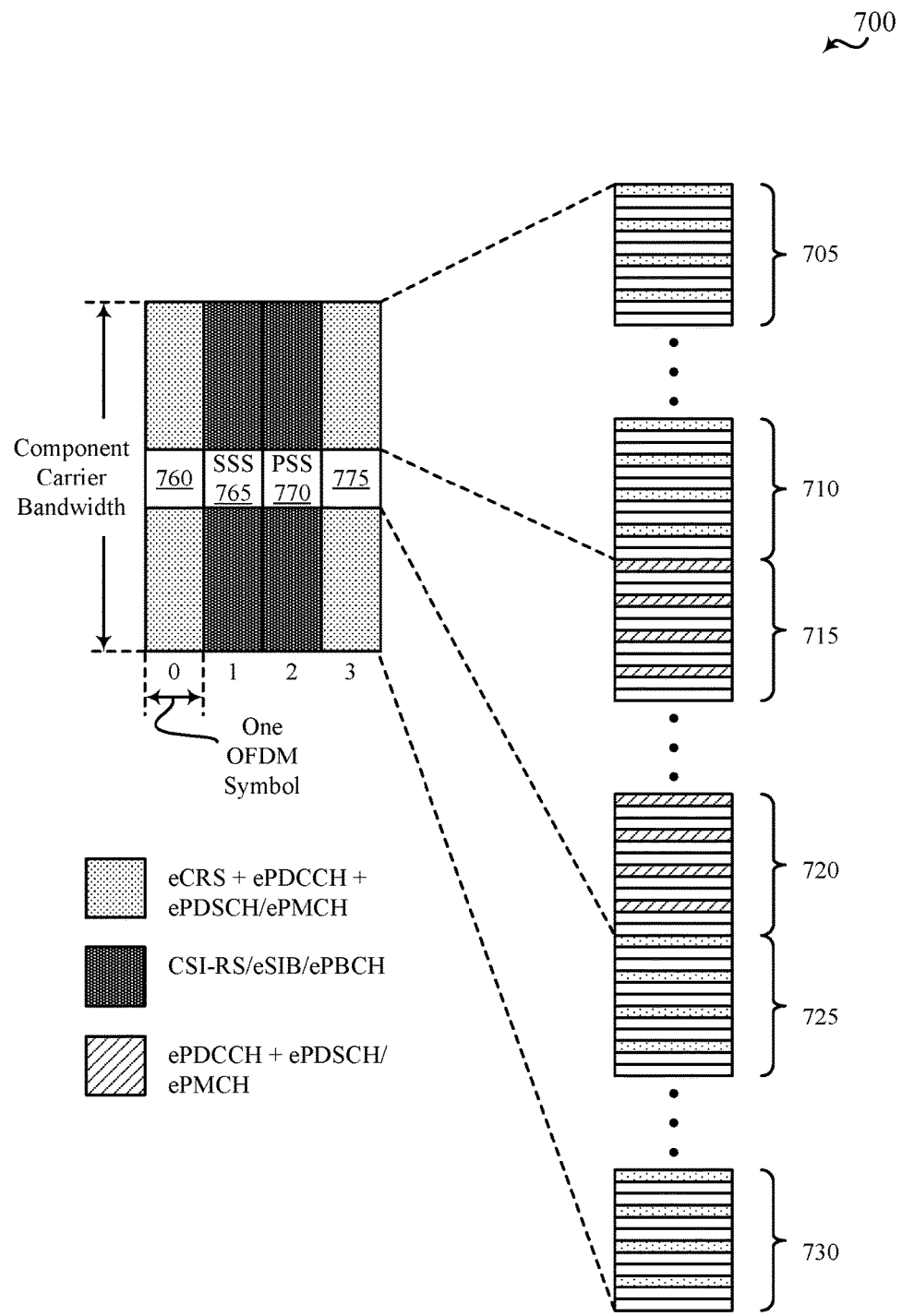
FIG. 7 shows an example of how reference signals and/or synchronization signals may be transmitted over an unlicensed radio frequency spectrum band to occupy a component carrier bandwidth, in accordance with various aspects of the present disclosure.

FIG. 7 shows an example 700 of how discovery signals (e.g., reference signals and/or synchronization signals) may be transmitted over an unlicensed radio frequency spectrum band to occupy a component carrier bandwidth, in accordance with various aspects of the present disclosure. In some examples, the unlicensed radio frequency spectrum band may include a radio frequency spectrum band for which apparatuses may need to contend for access because the radio frequency spectrum band is available for unlicensed use, such as Wi-Fi use. In an alternative to what is shown in FIG. 7, the unlicensed radio frequency spectrum band may be any radio frequency spectrum band.

As shown in FIG. 7, each of a number of OFDM symbols (e.g., OFDM symbols 0, 1, 2, and 3) may include a plurality of resource blocks (e.g., resource blocks 705, 710, 715, 720, 725, 730, etc.). Each resource block may include a plurality of subcarriers (e.g., twelve subcarriers). In some examples, a plurality of RSs may be transmitted/received in a first portion 760 of a first OFDM symbol (e.g., OFDM symbol 0) and/or a first portion 775 of a fourth OFDM symbol (e.g., OFDM symbol 3), and a first synchronization signal 765 (e.g., an SSS) and/or a second synchronization signal 770 (e.g., a PSS) may be respectively transmitted/received in a second OFDM symbol (e.g., OFDM symbol 1) and a third OFDM symbol (e.g., OFDM symbol 2).

In some examples, the first portion 760 of the first OFDM symbol and the first portion 775 of the fourth OFDM symbol may include a higher density of RSs than remaining portions of the first OFDM symbol and the fourth OFDM symbol. In some examples, the first portion 760 of the first OFDM symbol and/or the first portion 775 of the fourth OFDM symbol may each include a central set of resource blocks of a component carrier of the unlicensed radio frequency spectrum band (e.g., a center six resource blocks of a component carrier having 100 resource blocks, in which each resource block includes twelve subcarriers). In some examples, the first portion 760 of the first OFDM symbol and/or the first portion 775 of the fourth OFDM symbol may be associated with a plurality of subcarriers (e.g., a central set of subcarriers of a component carrier of the unlicensed radio frequency spectrum band). In some examples, an RS may be received over each of the subcarriers of the first OFDM symbol and/or the fourth OFDM symbol.

In some examples, the first synchronization signal 765 and/or the second synchronization signal 770 may be associated with a central set of resource blocks of a component carrier of the unlicensed radio frequency spectrum band (e.g., a center six resource blocks of a component carrier having 100 resource blocks, in which each resource block includes twelve subcarriers). In some examples, the first synchronization signal 765 and/or the second synchronization signal 770 may be associated with a plurality of subcarriers (e.g., a central set of subcarriers of a component carrier of the unlicensed radio frequency spectrum band).

In some examples, the first synchronization signal 765 and the second synchronization signal 770 may be received over the same antenna port. In some examples, the first synchronization signal 765 and/or the second synchronization signal 770 may be received over the same antenna port as the plurality of RSs. In some examples, the first OFDM symbol and/or the fourth OFDM symbol may further include at least one of a PDCCH, a PDSCH, and/or a PMCH. In some examples, the PDCCH may include an ePDCCH, the PDSCH may include an ePDSCH, and/or the PMCH may include an ePMCH. In some examples, the second OFDM symbol and/or the third OFDM symbol may further include at least one of a CSI-RS, a SIB, a PBCH, or a combination thereof. In some examples, the SIB may include an eSIB and/or the PBCH may include an ePBCH. In some examples, an RS or embedded user equipment-specific reference signal (UE-RS) may provide a phase reference for the PBCH.

In some examples, signals may be transmitted during the first OFDM symbol, the second OFDM symbol, the third OFDM symbol, and/or the fourth OFDM symbol in a configuration that occupies at least a certain percentage of the available frequency bandwidth in the unlicensed radio frequency spectrum band and satisfies one or more regulatory requirements (e.g., a requirement that at least 80% of the available frequency bandwidth be used).

In some examples, the RSs may include eCRSs, the SSS may include an eSSS, and/or the PSS may include an ePSS.

Figure 8:
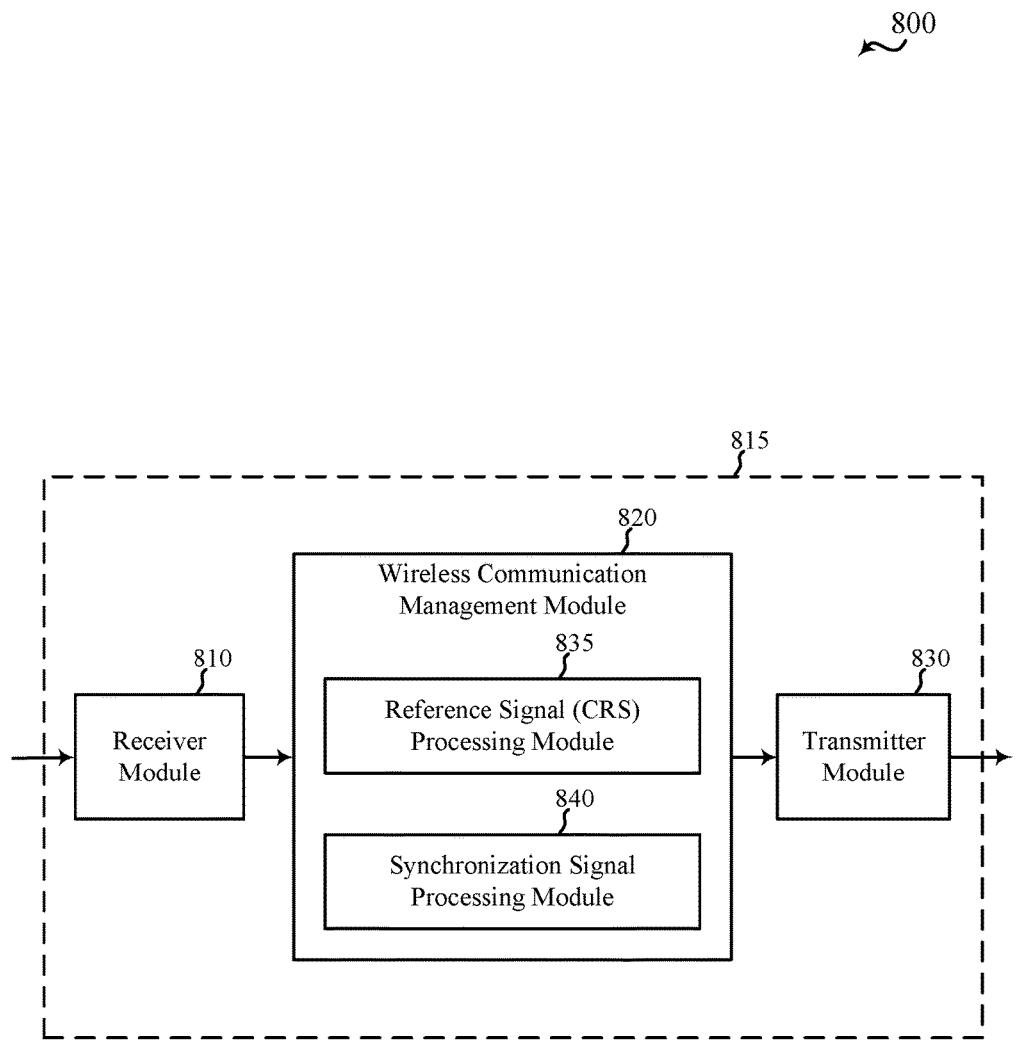
FIG. 8 shows a block diagram of a wireless device for use in wireless communication, in accordance with various aspects of the present disclosure.

FIG. 8 shows a block diagram 800 of a wireless device 815 for use in wireless communication, in accordance with various aspects of the present disclosure. The wireless device 815 may be an example of aspects of one or more of the UEs 115, 215, 216, 217, and/or 218 described with reference to FIGS. 1 and/or 2. The wireless device 815 may also be or include a processor. The wireless device 815 may include a receiver module 810, a wireless communication management module 820, and/or a transmitter module 830. Each of these modules may be in communication with each other.

The modules of the wireless device 815 may, individually or collectively, be implemented using one or more Application-Specific Integrated Circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field-Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 810 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 810 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 830 may include at least one RF transmitter, such as at least one RF transmitter operable to transmit over the licensed radio frequency spectrum band and/or the unlicensed radio frequency spectrum band. The transmitter module 830 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 820 may be used to manage one or more aspects of wireless communication for the wireless device 815. In some examples, the wireless communication management module 820 may include a reference signal (RS) processing module 835 and, optionally, a synchronization signal processing module 840. When both the RS processing module 835 and the synchronization signal processing module 840 are provided, each of these modules may be in communication with each other.

In some examples, the RS processing module 835 may be used to receive a first OFDM symbol including a plurality of RSs, which may be cell-specific reference signals (CRSs) or channel state information reference signals (CSI-RSs), over a radio frequency spectrum band. A first portion of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion of the first OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be received over each of the subcarriers of the first OFDM symbol. In some examples, the plurality of RSs may include a plurality of eCRSs.

In some examples, the synchronization signal processing module 840 may be used to receive a second OFDM symbol including a first synchronization signal over the radio frequency spectrum band. In some examples, the second OFDM symbol may be adjacent in time to the first OFDM symbol (e.g., the second OFDM symbol may immediately follow the first OFDM symbol in time). In some examples, the first synchronization signal may be associated with a central set of resource blocks of a component carrier of the radio frequency spectrum band (e.g., a center six resource blocks of a component carrier having 100 resource blocks, in which each resource block includes twelve subcarriers). In some examples, the first synchronization signal may be associated with a plurality of subcarriers (e.g., a central set of subcarriers of a component carrier of the radio frequency spectrum band).

In some examples of the wireless device 815, the received OFDM symbols may be received over an unlicensed radio frequency spectrum band. In some examples of the wireless device 815, the received OFDM symbols may be received over a licensed radio frequency spectrum band.

Figure 9:
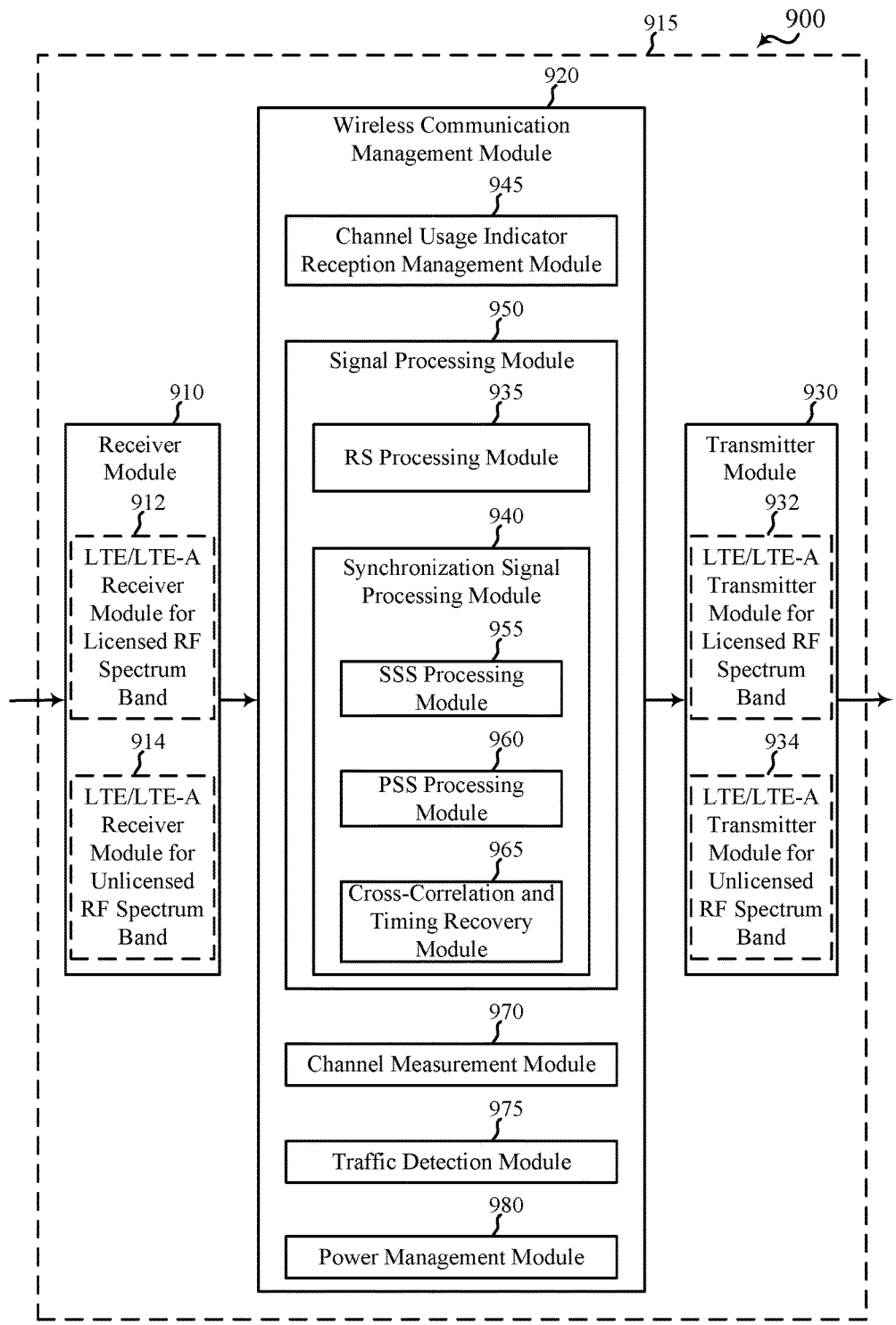
FIG. 9 shows a block diagram of a wireless device for use in wireless communication, in accordance with various aspects of the present disclosure.

FIG. 9 shows a block diagram 900 of a wireless device 915 for use in wireless communication, in accordance with various aspects of the present disclosure. The wireless device 915 may be an example of aspects of one or more of the UEs 115, 215, 216, 217, and/or 218 described with reference to FIGS. 1 and/or 2, and/or aspects of the wireless device 815 described with reference to FIG. 8. The wireless device 915 may also be or include a processor. The wireless device 915 may include a receiver module 910, a wireless communication management module 920, and/or a transmitter module 930. Each of these modules may be in communication with each other.

The modules of the wireless device 915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 910 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 910 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 912), and an LTE/LTE-A receiver module for communicating over the unlicensed radio frequency spectrum band (e.g., LTE/LTE-A receiver module for unlicensed RF spectrum band 914). The receiver module 910, including the LTE/LTE-A receiver module for licensed RF spectrum band 912 and/or the LTE/LTE-A receiver module for unlicensed RF spectrum band 914, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 930 may include at least one RF transmitter, such as at least one RF transmitter operable to transmit over the licensed radio frequency spectrum band and/or the unlicensed radio frequency spectrum band. The transmitter module 930 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 932), and an LTE/LTE-A transmitter module for communicating over the unlicensed radio frequency spectrum band (e.g., LTE/LTE-A transmitter module for unlicensed RF spectrum band 934). The transmitter module 930, including the LTE/LTE-A transmitter module for licensed RF spectrum band 932 and/or the LTE/LTE-A transmitter module for unlicensed RF spectrum band 934, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 920 may be used to manage one or more aspects of wireless communication for the wireless device 915. In some examples, the wireless communication management module 920 may include a channel usage indicator reception management module 945, a signal processing module 950, a channel measurement module 970, a traffic detection module 975, and/or a power management module 980.

In some examples, the channel usage indicator reception management module 945 may be used to receive a channel usage indicator over a radio frequency spectrum band. In some examples, the channel usage indicator may include a CUBS.

In some examples, the signal processing module 950 may be used to receive a number of signals and may include a reference signal (RS) processing module 935 and/or a synchronization signal processing module 940. In some examples, the RS processing module 935 may be used to receive a first OFDM symbol including a plurality of RSs, which may be cell-specific reference signals (CRSs) or channel state information reference signals (CSI-RSs), over a radio frequency spectrum band. A first portion of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion of the first OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be received over each of the subcarriers of the first OFDM symbol. In some examples, the plurality of RSs may include a plurality of eCRSs.

In some examples, the RS processing module 935 may also be used to receive a fourth OFDM symbol including a plurality of RSs, which may be cell-specific reference signals (CRSs) or channel state information reference signals (CSI-RSs), over the radio frequency spectrum band. A first portion of the fourth OFDM symbol may include a higher density of RSs than a remaining portion of the fourth OFDM symbol. In some examples, the fourth OFDM symbol may be adjacent in time to a third OFDM symbol (e.g., the fourth OFDM symbol may immediately follow the third OFDM symbol in time). In some examples, the first portion of the fourth OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be received over each of the subcarriers of the first OFDM symbol. In some examples, the resource blocks and/or subcarriers included in the first portion of the first OFDM symbol may be the same resource blocks and/or subcarriers included in the first portion of the fourth OFDM symbol. In some examples, the plurality of RSs may include a plurality of eCRSs.

In some examples, the first OFDM symbol and/or the fourth OFDM symbol may further include at least one of a PDCCH, a PDSCH, and/or a PMCH. In some examples, the PDCCH may include an ePDCCH, the PDSCH may include an ePDSCH, and/or the PMCH may include an ePMCH.

In some examples, the wireless device 915 may include determining a base station parameter based at least in part on the received pluralities of RSs. The base station parameter may include, for example, a PCI of the base station, a current subframe number of the base station, or a combination thereof.

In some examples, the synchronization signal processing module 940 may include an SSS processing module 955, a PSS processing module 960, and/or a cross-correlation and timing recovery module 965. In some examples, the synchronization signal processing module 940 and/or the SSS processing module 955 may be used to receive a second OFDM symbol including a first synchronization signal over a radio frequency spectrum band. In some examples, the second OFDM symbol may be adjacent in time to the first OFDM symbol (e.g., the second OFDM symbol may immediately follow the first OFDM symbol in time). In some examples, the first synchronization signal may be associated with a central set of resource blocks of a component carrier of the radio frequency spectrum band (e.g., a center six resource blocks of a component carrier having 100 resource blocks, in which each resource block includes twelve subcarriers). In some examples, the first synchronization signal may be associated with a plurality of subcarriers (e.g., a central set of subcarriers of a component carrier of the radio frequency spectrum band). In some examples, the first synchronization signal may include an SSS. In some examples, the SSS may include an eSSS.

In some examples, the synchronization signal processing module 940 and/or the SSS processing module 955 may be used to receive a third OFDM symbol including a second synchronization signal over the radio frequency band. In some examples, the third OFDM symbol may be adjacent in time to the second OFDM symbol (e.g., the third OFDM symbol may immediately follow the second OFDM symbol in time). In some examples, the second synchronization signal may be associated with a central set of resource blocks of a component carrier of the radio frequency spectrum band (e.g., a center six resource blocks of a component carrier having 100 resource blocks, in which each resource block includes twelve subcarriers). In some examples, the second synchronization signal may be associated with a plurality of subcarriers (e.g., a central set of subcarriers of a component carrier of the radio frequency spectrum band). In some examples, the second synchronization signal may include a PSS. In some examples, the PSS may include an ePSS.

In some examples, the first synchronization signal and the second synchronization signal may be received over the same antenna port. In some examples, the first synchronization signal and/or the second synchronization signal may be received over the same antenna port as the plurality of RSs. In some examples, each of the second OFDM symbol and the third OFDM symbol may further include at least one of a CSI-RS, a SIB, a PBCH, or a combination thereof. In some examples, the SIB may include an eSIB and/or the PBCH may include an ePBCH. In some examples, an RS or embedded user equipment-specific reference signal (UE-RS) may provide a phase reference for the PBCH.

In some examples, the cross-correlation and timing recovery module 965 may be used to synchronize the wireless device 915 with a base station based at least in part on a received first synchronization signal and/or a received second synchronization signal. In some examples, the synchronizing may include performing a cross-correlation of samples of the first synchronization signal and the second synchronization signal, and recovering a timing of the base station based at least in part on the cross-correlation of the samples.

In some examples, the first OFDM symbol, the second OFDM symbol, the third OFDM symbol, and the fourth OFDM symbol may be respectively received as the first OFDM symbol, the second OFDM symbol, the third OFDM symbol, and the fourth OFDM symbol of a subframe having fourteen OFDM symbols. In some examples, the eighth OFDM symbol and the eleventh OFDM symbol of the subframe may be configured similarly to the first OFDM symbol and the fourth OFDM symbol. In some examples, a PDCCH, a PDSCH, and/or a PMCH may be received by the signal processing module 950 during the fifth OFDM symbol, the sixth OFDM symbol, the seventh OFDM symbol, the ninth OFDM symbol, the tenth OFDM symbol, the twelfth OFDM symbol, the thirteenth OFDM symbol, and/or the fourteenth OFDM symbol of the subframe. In some examples, the PDCCH may include an ePDCCH, the PDSCH may include an ePDSCH, and/or the PMCH may include an ePMCH. In some examples, the OFDM symbols received by the RS processing module 935, the SSS processing module 955, and/or the PSS processing module 960 may be received during the first subframe and/or the sixth subframe of a radio frame having ten subframes.

In some examples, and when the first portion of the first OFDM symbol includes a central set of resource blocks of a component carrier of the radio frequency spectrum band, the channel measurement module 970 may be used to perform a narrow band channel measurement on the central set of resource blocks, where the measurement can be based on all of the RSs from the plurality of RSs, or a subset of RSs from the plurality of RSs.

In some examples, the traffic detection module 975 may be used to measure a symbol energy. The traffic detection module 975 may also be used to perform a blind detection on the first OFDM symbol to determine whether the OFDM symbol comprises a transmission from a base station. The traffic detection module 975 may also be used to perform a blind detection of a remaining amount of downlink traffic in a subframe (e.g., a remaining amount of downlink traffic in a subframe in which the first OFDM symbol, the second OFDM symbol, the third OFDM symbol, and/or the fourth OFDM symbol are received). In some examples, the remaining amount of downlink traffic may be a remaining amount of downlink traffic following the fourth OFDM symbol (or in examples in which the third OFDM symbol and/or fourth OFDM symbol are not transmitted or received, the remaining amount of downlink traffic may be a remaining amount of downlink traffic following the second OFDM symbol or the third OFDM symbol). In some examples, the blind detection may be based at least in part on the measured symbol energy. In some examples, the blind detection may be based at least in part on a first plurality of CSI-RSs received in the second OFDM symbol (e.g., CSI-RSs received in the same OFDM symbol as the first synchronization signal) and/or a second plurality of CSI-RSs received in the third OFDM symbol (e.g., CSI-RSs received in the same OFDM symbol as the second synchronization signal).

In some examples, the power management module 980 may be used to selectively power down part or all of the receiver module 910 based at least in part on the blind detection performed by the traffic detection module 975. In some examples, the receiver may be powered down when the detected remaining amount of downlink traffic in the subframe fails to satisfy a threshold.

In some examples of the wireless device 915, the received OFDM symbols may be received over an unlicensed radio frequency spectrum band. In some examples of the wireless device 915, the received OFDM symbols may be received over a licensed radio frequency spectrum band.

Figure 10:
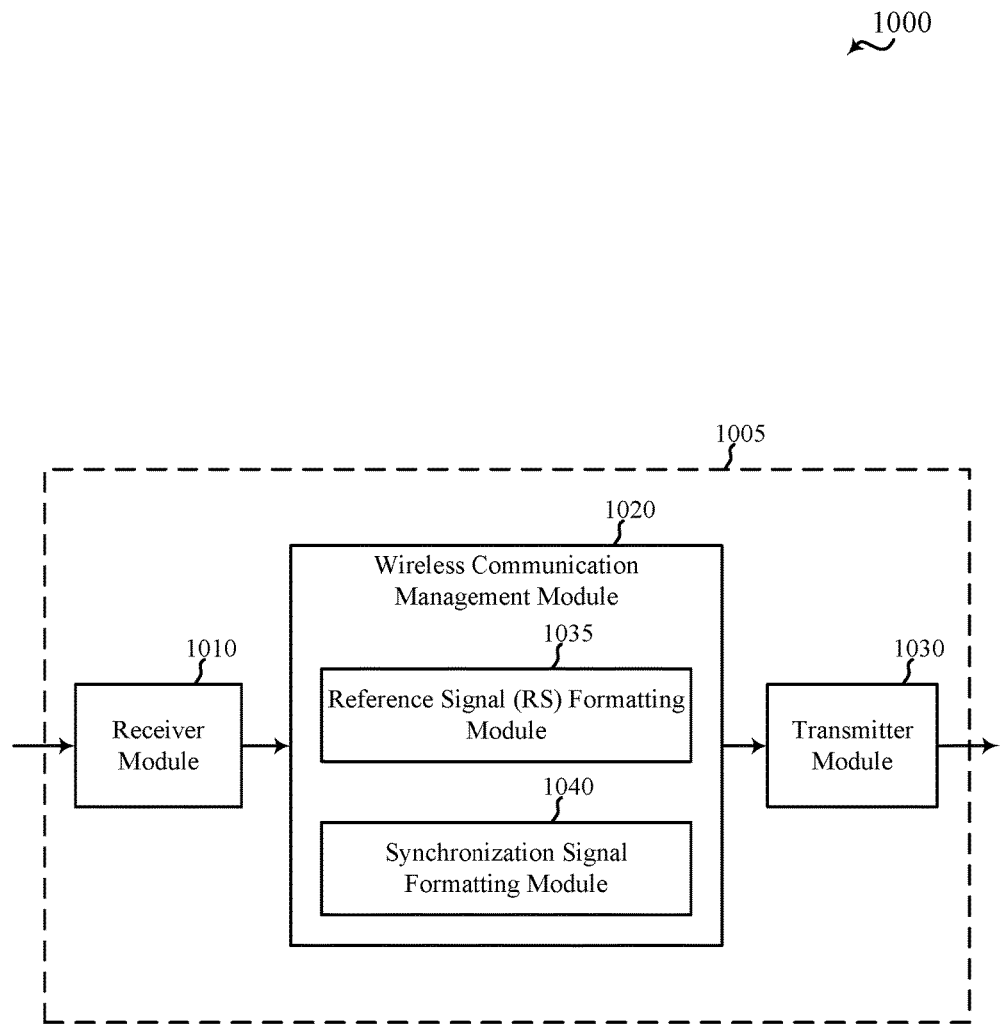
FIG. 10 shows a block diagram of a wireless device for use in wireless communication, in accordance with various aspects of the present disclosure.

FIG. 10 shows a block diagram 1000 of a wireless device 1005 for use in wireless communication, in accordance with various aspects of the present disclosure. The wireless device 1105 may be an example of aspects of one or more of the base stations 105, 205, and/or 206 described with reference to FIGS. 1 and/or 2. The wireless device 1005 may also be or include a processor. The wireless device 1005 may include a receiver module 1010, a wireless communication management module 1020, and/or a transmitter module 1030. Each of these modules may be in communication with each other.

The modules of the wireless device 1005 may, individually or collectively, be implemented using one or more Application-Specific Integrated Circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field-Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1010 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1010 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1030 may include at least one RF transmitter, such as at least one RF transmitter operable to transmit over the licensed radio frequency spectrum band and/or the unlicensed radio frequency spectrum band. The transmitter module 1030 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1020 may be used to manage one or more aspects of wireless communication for the wireless device 1005. In some examples, the wireless communication management module 1020 may include a reference signal (RS) formatting module 1035 and, optionally, a synchronization signal formatting module 1040. When both the RS processing module 835 and the synchronization signal processing module 840 are provided, each of these modules may be in communication with each other.

In some examples, the RS formatting module 1035 may be used to transmit a first OFDM symbol including a plurality of RSs, which may be cell-specific reference signals (CRSs) or channel state information reference signals (CSI-RSs), over a radio frequency spectrum band. A first portion of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion of the first OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be received over each of the subcarriers of the first OFDM symbol. In some examples, the plurality of RSs may include a plurality of eCRSs.

In some examples, the synchronization signal formatting module 1040 may be used to transmit a second OFDM symbol including a first synchronization signal over the radio frequency spectrum band. In some examples, the second OFDM symbol may be adjacent in time to the first OFDM symbol (e.g., the second OFDM symbol may immediately follow the first OFDM symbol in time). In some examples, the first synchronization signal may be associated with a central set of resource blocks of a component carrier of the radio frequency spectrum band (e.g., a center six resource blocks of a component carrier having 100 resource blocks, in which each resource block includes twelve subcarriers). In some examples, the first synchronization signal may be associated with a plurality of subcarriers (e.g., a central set of subcarriers of a component carrier of the radio frequency spectrum band).

In some examples of the wireless device 1005, the transmitted OFDM symbols may be transmitted over an unlicensed radio frequency spectrum band. In some examples of the wireless device 1005, the transmitted OFDM symbols may be transmitted over a licensed radio frequency spectrum band.

Figure 11:
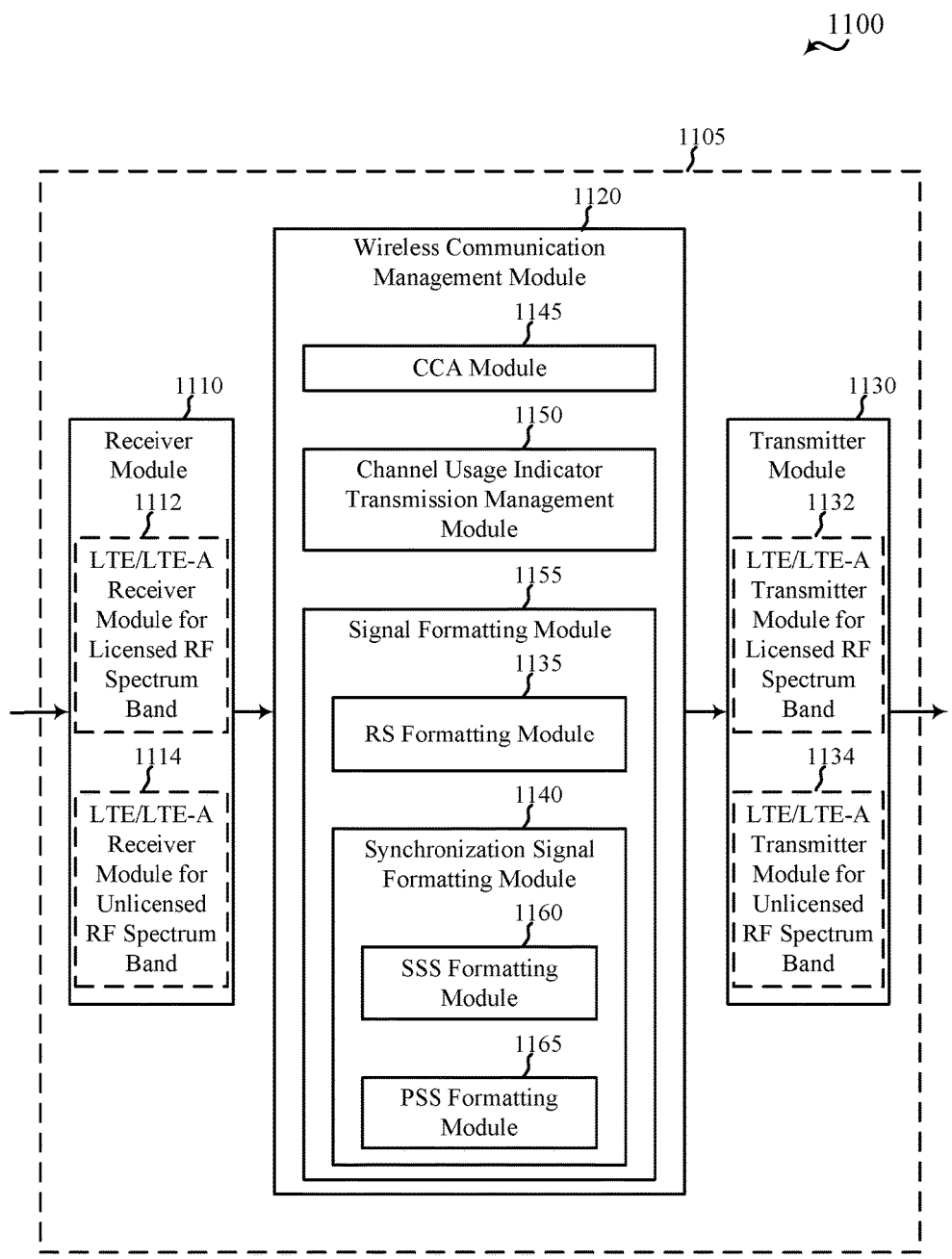
FIG. 11 shows a block diagram of a wireless device for use in wireless communication, in accordance with various aspects of the present disclosure.

FIG. 11 shows a block diagram 1100 of a wireless device 1105 for use in wireless communication, in accordance with various aspects of the present disclosure. The wireless device 1105 may be an example of aspects of one or more of the base stations 105, 205, and/or 206 described with reference to FIGS. 1 and/or 2, and/or aspects of the wireless device 1005 described with reference to FIG. 10. The wireless device 1105 may also be or include a processor. The wireless device 1105 may include a receiver module 1110, a wireless communication management module 1120, and/or a transmitter module 1130. Each of these modules may be in communication with each other.

The modules of the wireless device 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1110 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1110 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 1112), and an LTE/LTE-A receiver module for communicating over the unlicensed radio frequency spectrum band (e.g., LTE/LTE-A receiver module for unlicensed RF spectrum band 1114). The receiver module 1110, including the LTE/LTE-A receiver module for licensed RF spectrum band 1112 and/or the LTE/LTE-A receiver module for unlicensed RF spectrum band 1114, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1130 may include at least one RF transmitter, such as at least one RF transmitter operable to transmit over the licensed radio frequency spectrum band and/or the unlicensed radio frequency spectrum band. The transmitter module 1130 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 1132), and an LTE/LTE-A transmitter module for communicating over the unlicensed radio frequency spectrum band (e.g., LTE/LTE-A transmitter module for unlicensed RF spectrum band 1134). The transmitter module 1130, including the LTE/LTE-A transmitter module for licensed RF spectrum band 1132 and/or the LTE/LTE-A transmitter module for unlicensed RF spectrum band 1134, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1120 may be used to manage one or more aspects of wireless communication for the wireless device 1105. In some examples, the wireless communication management module 1120 may include a CCA module 1145, a channel usage indicator transmission management module 1150, and/or a signal formatting module 1155.

In some examples, the CCA module 1145 may be used to perform a CCA on a radio frequency spectrum band.

In some examples, the channel usage indicator transmission management module 1150 may be used to transmit a channel usage indicator over a radio frequency spectrum band when a CCA performed by the CCA module 1145 is successful. In some examples, the channel usage indicator may include a CUBS.

In some examples, the signal formatting module 1155 may be used to format a number of signals and may include a reference signal (RS) formatting module 1135 and/or a synchronization signal formatting module 1140. In some examples, the RS formatting module 1135 may be used to transmit a first OFDM symbol including a plurality of RSs, which may be cell-specific reference signals (CRSs) or channel state information reference signals (CSI-RSs), over the radio frequency spectrum band. A first portion of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion of the first OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be transmitted over each of the subcarriers of the first OFDM symbol. In some examples, the plurality of RSs may include a plurality of eCRSs.

In some examples, the RS formatting module 1135 may also be used to transmit a fourth OFDM symbol including a plurality of RSs, which may be cell-specific reference signals (CRSs) or channel state information reference signals (CSI-RSs), over the radio frequency spectrum band. A first portion of the fourth OFDM symbol may include a higher density of RSs than a remaining portion of the fourth OFDM symbol. In some examples, the fourth OFDM symbol may be adjacent in time to a third OFDM symbol (e.g., the fourth OFDM symbol may immediately follow the third OFDM symbol in time). In some examples, the first portion of the fourth OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be transmitted over each of the subcarriers of the first OFDM symbol. In some examples, the resource blocks and/or subcarriers included in the first portion of the first OFDM symbol may be the same resource blocks and/or subcarriers included in the first portion of the fourth OFDM symbol. In some examples, the plurality of RSs may include a plurality of eCRSs.

In some examples, the first OFDM symbol and/or the fourth OFDM symbol may further include at least one of a PDCCH, a PDSCH, and/or a PMCH. In some examples, the PDCCH may include an ePDCCH, the PDSCH may include an ePDSCH, and/or the PMCH may include an ePMCH.

In some examples, the synchronization signal formatting module 1140 may include an SSS formatting module 1160 and/or a PSS formatting module 1165. In some examples, the synchronization signal formatting module 1140 and/or the SSS formatting module 1160 may be used to transmit a second OFDM symbol including a first synchronization signal over the radio frequency spectrum band. In some examples, the second OFDM symbol may be adjacent in time to the first OFDM symbol (e.g., the second OFDM symbol may immediately follow the first OFDM symbol in time). In some examples, the first synchronization signal may be associated with a central set of resource blocks of a component carrier of the radio frequency spectrum band (e.g., a center six resource blocks of a component carrier having 100 resource blocks, in which each resource block includes twelve subcarriers). In some examples, the first synchronization signal may be associated with a plurality of subcarriers (e.g., a central set of subcarriers of a component carrier of the radio frequency spectrum band). In some examples, the first synchronization signal may include an SSS. In some examples, the SSS may include an eSSS.

In some examples, the synchronization signal formatting module 1140 and/or the PSS formatting module 1165 may be used to transmit a third OFDM symbol including a second synchronization signal over the radio frequency band. In some examples, the third OFDM symbol may be adjacent in time to the second OFDM symbol (e.g., the third OFDM symbol may immediately follow the second OFDM symbol in time). In some examples, the second synchronization signal may be associated with a central set of resource blocks of a component carrier of the radio frequency spectrum band (e.g., a center six resource blocks of a component carrier having 100 resource blocks, in which each resource block includes twelve subcarriers). In some examples, the second synchronization signal may be associated with a plurality of subcarriers (e.g., a central set of subcarriers of a component carrier of the radio frequency spectrum band). In some examples, the second synchronization signal may include a PSS. In some examples, the PSS may include an ePSS.

In some examples, the first synchronization signal and the second synchronization signal may be transmitted over the same antenna port. In some examples, the first synchronization signal and/or the second synchronization signal may be transmitted over the same antenna port as the plurality of RSs. In some examples, each of the second OFDM symbol and the third OFDM symbol may further include at least one of a CSI-RS, a SIB, a PBCH, or a combination thereof. In some examples, the SIB may include an eSIB and/or the PBCH may include an ePBCH. In some examples, an RS or embedded user equipment-specific reference signal (UE-RS) may provide a phase reference for the PBCH.

In some examples, the first OFDM symbol, the second OFDM symbol, the third OFDM symbol, and the fourth OFDM symbol may be respectively transmitted as the first OFDM symbol, the second OFDM symbol, the third OFDM symbol, and the fourth OFDM symbol of a subframe having fourteen OFDM symbols. In some examples, the eighth OFDM symbol and the eleventh OFDM symbol of the subframe may be configured similarly to the first OFDM symbol and the fourth OFDM symbol. In some examples, a PDCCH, a PDSCH, and/or a PMCH may be transmitted during the fifth OFDM symbol, the sixth OFDM symbol, the seventh OFDM symbol, the ninth OFDM symbol, the tenth OFDM symbol, the twelfth OFDM symbol, the thirteenth OFDM symbol, and/or the fourteenth OFDM symbol of the subframe. In some examples, the PDCCH may include an ePDCCH, the PDSCH may include an ePDSCH, and/or the PMCH may include an ePMCH. In some examples, the OFDM symbols transmitted by the RS formatting module 1135, the SSS formatting module 1160, and/or the PSS formatting module 1165 may be transmitted during the first subframe and/or the sixth subframe of a radio frame having ten subframes.

In some examples of the wireless device 1105, the received OFDM symbols may be received over an unlicensed radio frequency spectrum band. In some examples of the wireless device 1105, the received OFDM symbols may be received over a licensed radio frequency spectrum band.

Figure 12:
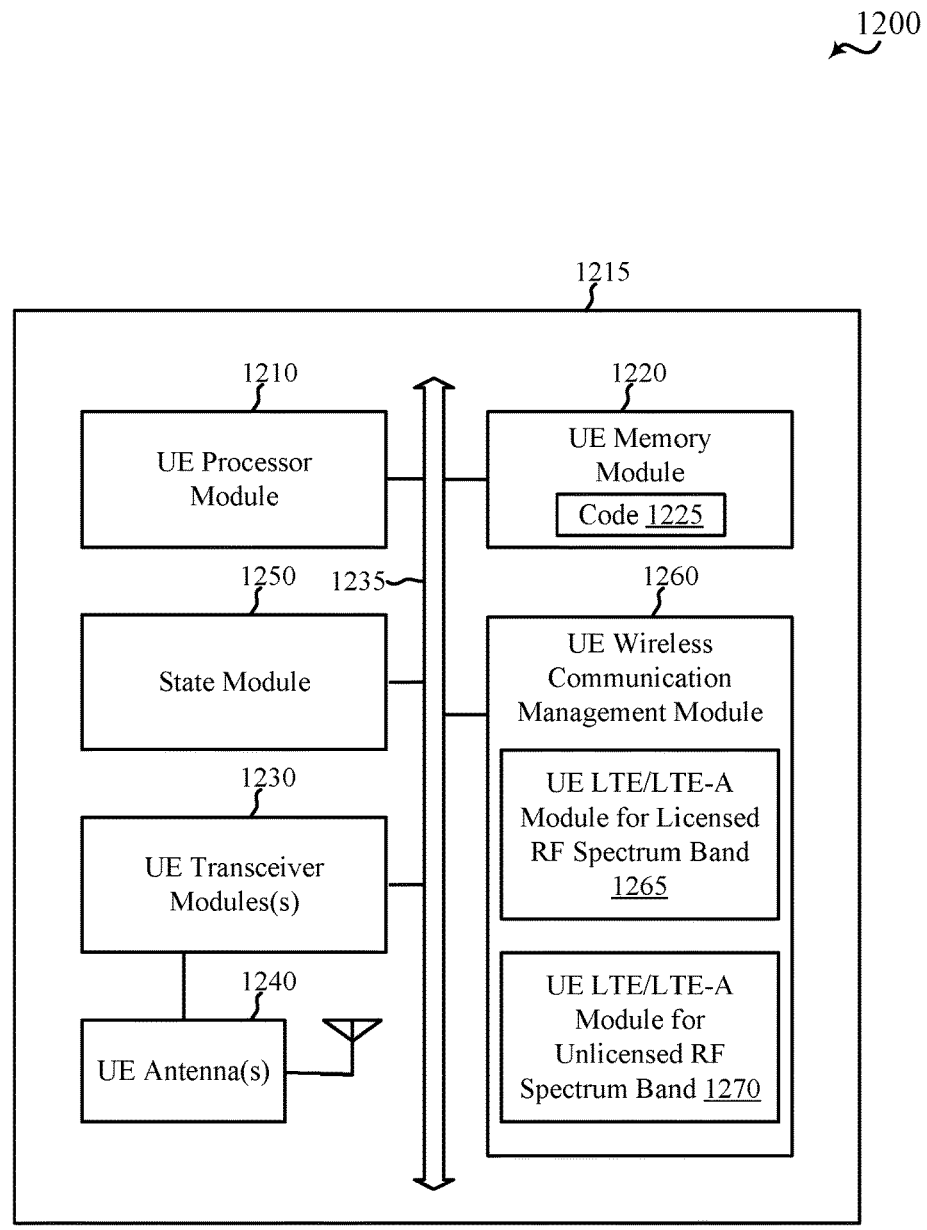
FIG. 12 shows a block diagram of a UE for use in wireless communication, in accordance with various aspects of the present disclosure.

FIG. 12 shows a block diagram 1200 of a UE 1215 for use in wireless communication, in accordance with various aspects of the present disclosure. The UE 1215 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1215 may, in some examples, have an internal power supply (not shown), such as a small battery, to facilitate mobile operation. In some examples, the UE 1215 may be an example of aspects of one or more of the UE 115, 215, 216, 217, and/or 218 described with reference to FIGS. 1 and/or 2, and/or aspects of one or more of the wireless devices 815 and/or 915 described with reference to FIGS. 8 and/or 9. The UE 1215 may be configured to implement at least some of the UE and/or wireless device features and functions described with reference to FIGS. 1, 2, 3, 4, 5, 6, 7, 8, and/or 9.

The UE 1215 may include a UE processor module 1210, a UE memory module 1220, at least one UE transceiver module (represented by UE transceiver module(s) 1230), at least one UE antenna (represented by UE antenna(s) 1240), and/or a UE wireless communication management module 1260. Each of these components may be in communication with each other, directly or indirectly, over one or more buses 1235.

The UE memory module 1220 may include random access memory (RAM) and/or read-only memory (ROM). The UE memory module 1220 may store computer-readable, computer-executable code 1225 containing instructions that are configured to, when executed, cause the UE processor module 1210 to perform various functions described herein related to wireless communication. Alternatively, the code 1225 may not be directly executable by the UE processor module 1210 but be configured to cause the UE 1215 (e.g., when compiled and executed) to perform various of the functions described herein.

The UE processor module 1210 may include an intelligent hardware device, e.g., a central processing unit (CPU), a microcontroller, an ASIC, etc. The UE processor module 1210 may process information received through the UE transceiver module(s) 1230 and/or information to be sent to the UE transceiver module(s) 1230 for transmission through the UE antenna(s) 1240. The UE processor module 1210 may handle, alone or in connection with the UE wireless communication management module 1260, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use).

The UE transceiver module(s) 1230 may include a modem configured to modulate packets and provide the modulated packets to the UE antenna(s) 1240 for transmission, and to demodulate packets received from the UE antenna(s) 1240. The UE transceiver module(s) 1230 may, in some examples, be implemented as one or more UE transmitter modules and one or more separate UE receiver modules. The UE transceiver module(s) 1230 may support communications in the licensed radio frequency spectrum band and/or the unlicensed radio frequency spectrum band. The UE transceiver module(s) 1230 may be configured to communicate bi-directionally, via the UE antenna(s) 1240, with one or more of the base stations 105, 205, and/or 206 described with reference to FIGS. 1 and/or 2. While the UE 1215 may include a single UE antenna, there may be examples in which the UE 1215 may include multiple UE antennas 1240.

The UE state module 1250 may be used, for example, to manage transitions of the UE 1215 between a Radio Resource Control (RRC) idle state and an RRC connected state, and may be in communication with other components of the UE 1215, directly or indirectly, over the one or more buses 1235. The UE state module 1250, or portions of it, may include a processor, and/or some or all of the functions of the UE state module 1250 may be performed by the UE processor module 1210 and/or in connection with the UE processor module 1210.

The UE wireless communication management module 1260 may be configured to perform and/or control some or all of the UE and/or wireless device features and/or functions described with reference to FIGS. 1, 2, 3, 4, 5, 6, 7, 8, and/or 9 related to wireless communication over a licensed radio frequency spectrum band and/or an unlicensed radio frequency spectrum band. For example, the UE wireless communication management module 1260 may be configured to support a supplemental downlink mode, a carrier aggregation mode, and/or a standalone mode using the licensed radio frequency spectrum band and/or the unlicensed radio frequency spectrum band. The UE wireless communication management module 1260 may include a UE LTE/LTE-A module for licensed RF spectrum band 1265 configured to handle LTE/LTE-A communications in the licensed radio frequency spectrum band, and a UE LTE/LTE-A module for unlicensed RF spectrum band 1270 configured to handle LTE/LTE-A communications in the unlicensed radio frequency spectrum band. The UE wireless communication management module 1260, or portions of it, may include a processor, and/or some or all of the functions of the UE wireless communication management module 1260 may be performed by the UE processor module 1210 and/or in connection with the UE processor module 1210. In some examples, the UE wireless communication management module 1260 may be an example of the wireless communication management module 820 and/or 920 described with reference to FIGS. 8 and/or 9.

Figure 13:
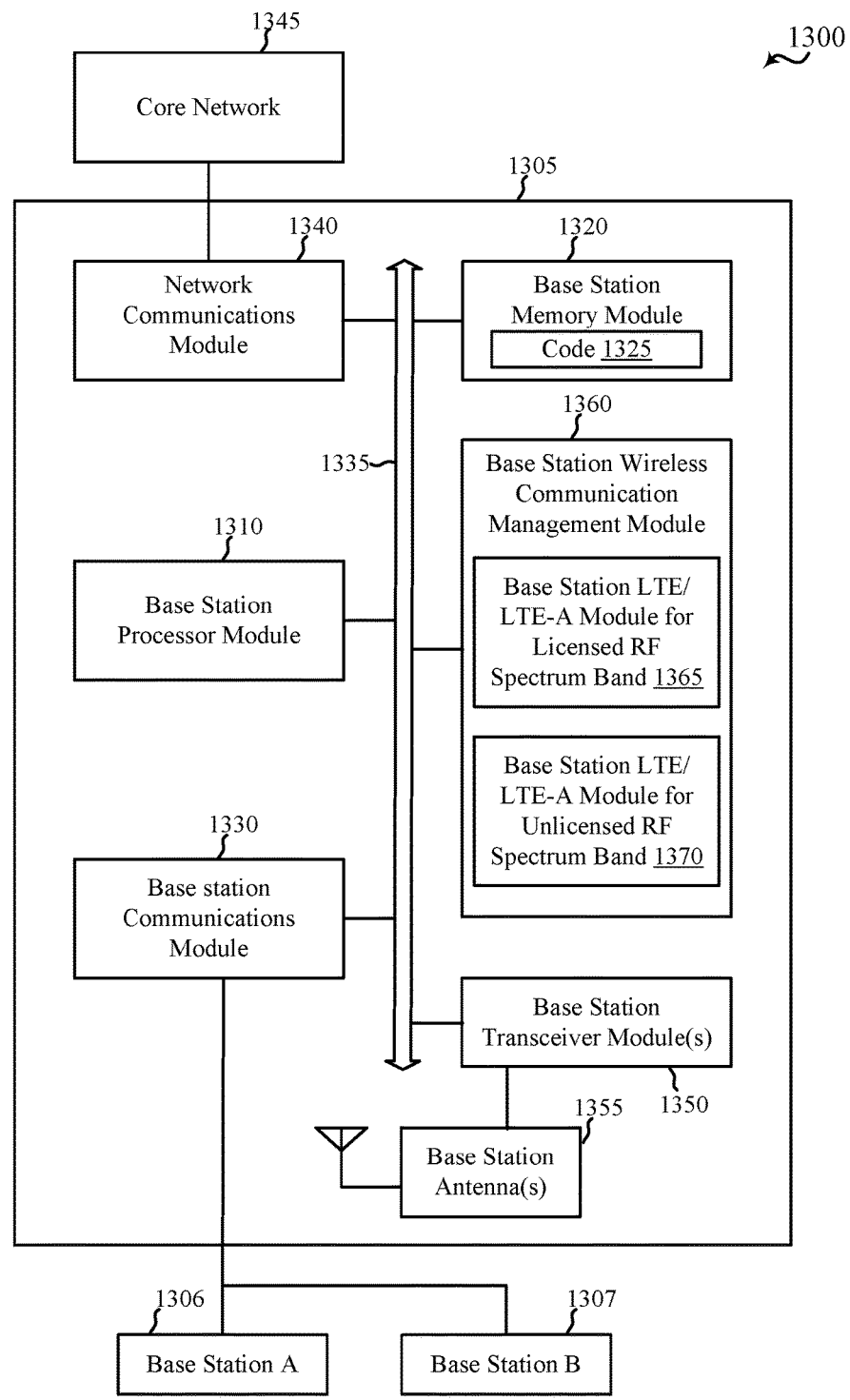
FIG. 13 shows a block diagram of a base station (e.g., a base station forming part or all of an eNB) for use in wireless communication, in accordance with various aspects of the present disclosure.

FIG. 13 shows a block diagram 1300 of a base station 1305 (e.g., a base station forming part or all of an eNB) for use in wireless communication, in accordance with various aspects of the present disclosure. In some examples, the base station 1305 may be an example of one or more aspects of the base station 105, 205, and/or 206 described with reference to FIGS. 1 and/or 2. The base station 1305 may be configured to implement or facilitate at least some of the base station features and functions described with reference to FIGS. 1, 2, 3, 4, 5, 6, 7, 10, and/or 11.

The base station 1305 may include a base station processor module 1310, a base station memory module 1320, at least one base station transceiver module (represented by base station transceiver module(s) 1350), at least one base station antenna (represented by base station antenna(s) 1355), and/or a base station wireless communication management module 1360. The base station 1305 may also include one or more of a base station communications module 1330 and/or a network communications module 1340. Each of these components may be in communication with each other, directly or indirectly, over one or more buses 1335.

The base station memory module 1320 may include RAM and/or ROM. The base station memory module 1320 may store computer-readable, computer-executable code 1325 containing instructions that are configured to, when executed, cause the base station processor module 1310 to perform various functions described herein related to wireless communication. Alternatively, the code 1325 may not be directly executable by the base station processor module 1310 but be configured to cause the base station 1305 (e.g., when compiled and executed) to perform various of the functions described herein.

The base station processor module 1310 may include an intelligent hardware device, e.g., a CPU, a microcontroller, an ASIC, etc. The base station processor module 1310 may process information received through the base station transceiver module(s) 1350, the base station communications module 1330, and/or the network communications module 1340. The base station processor module 1310 may also process information to be sent to the transceiver module(s) 1350 for transmission through the antenna(s) 1355, to the base station communications module 1330, for transmission to one or more other base stations 1306 and 1307, and/or to the network communications module 1340 for transmission to a core network 1345, which may be an example of one or more aspects of the core network 130 described with reference to FIG. 1. The base station processor module 1310 may handle, alone or in connection with the base station wireless communication management module 1360, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use).

The base station transceiver module(s) 1350 may include a modem configured to modulate packets and provide the modulated packets to the base station antenna(s) 1355 for transmission, and to demodulate packets received from the base station antenna(s) 1355. The base station transceiver module(s) 1350 may, in some examples, be implemented as one or more base station transmitter modules and one or more separate base station receiver modules. The base station transceiver module(s) 1350 may support communications in the licensed radio frequency spectrum band and/or the unlicensed radio frequency spectrum band. The base station transceiver module(s) 1350 may be configured to communicate bi-directionally, via the antenna(s) 1355, with one or more UEs and/or wireless devices, such as one or more of the UEs 115, 215, 216, 217, 218, and/or 1215 described with reference to FIGS. 1, 2, and/or 12, and/or one or more of the wireless devices 815 and/or 915 described with reference to FIGS. 8 and/or 9. The base station 1305 may, for example, include multiple base station antennas 1355 (e.g., an antenna array). The base station 1305 may communicate with the core network 1345 through the network communications module 1340. The base station 1305 may also communicate with other base stations, such as the base stations 1306 and 1307, using the base station communications module 1330.

The base station wireless communication management module 1360 may be configured to perform and/or control some or all of the features and/or functions described with reference to FIGS. 1, 2, 3, 4, 5, 6, 7, 10, and/or 11 related to wireless communication over a licensed radio frequency spectrum band and/or an unlicensed radio frequency spectrum band. For example, the base station wireless communication management module 1360 may be configured to support a supplemental downlink mode, a carrier aggregation mode, and/or a standalone mode using the licensed radio frequency spectrum band and/or the unlicensed radio frequency spectrum band. The base station wireless communication management module 1360 may include a base station LTE/LTE-A module for licensed RF spectrum band 1365 configured to handle LTE/LTE-A communications in the licensed radio frequency spectrum band, and a base station LTE/LTE-A module for unlicensed RF spectrum band 1370 configured to handle LTE/LTE-A communications in the unlicensed radio frequency spectrum band. The base station wireless communication management module 1360, or portions of it, may include a processor, and/or some or all of the functions of the base station wireless communication management module 1360 may be performed by the base station processor module 1310 and/or in connection with the base station processor module 1310. In some examples, the base station wireless communication management module 1360 may be an example of the wireless communication management module 1020 and/or 1120 described with reference to FIGS. 10 and/or 11.

Figure 14:
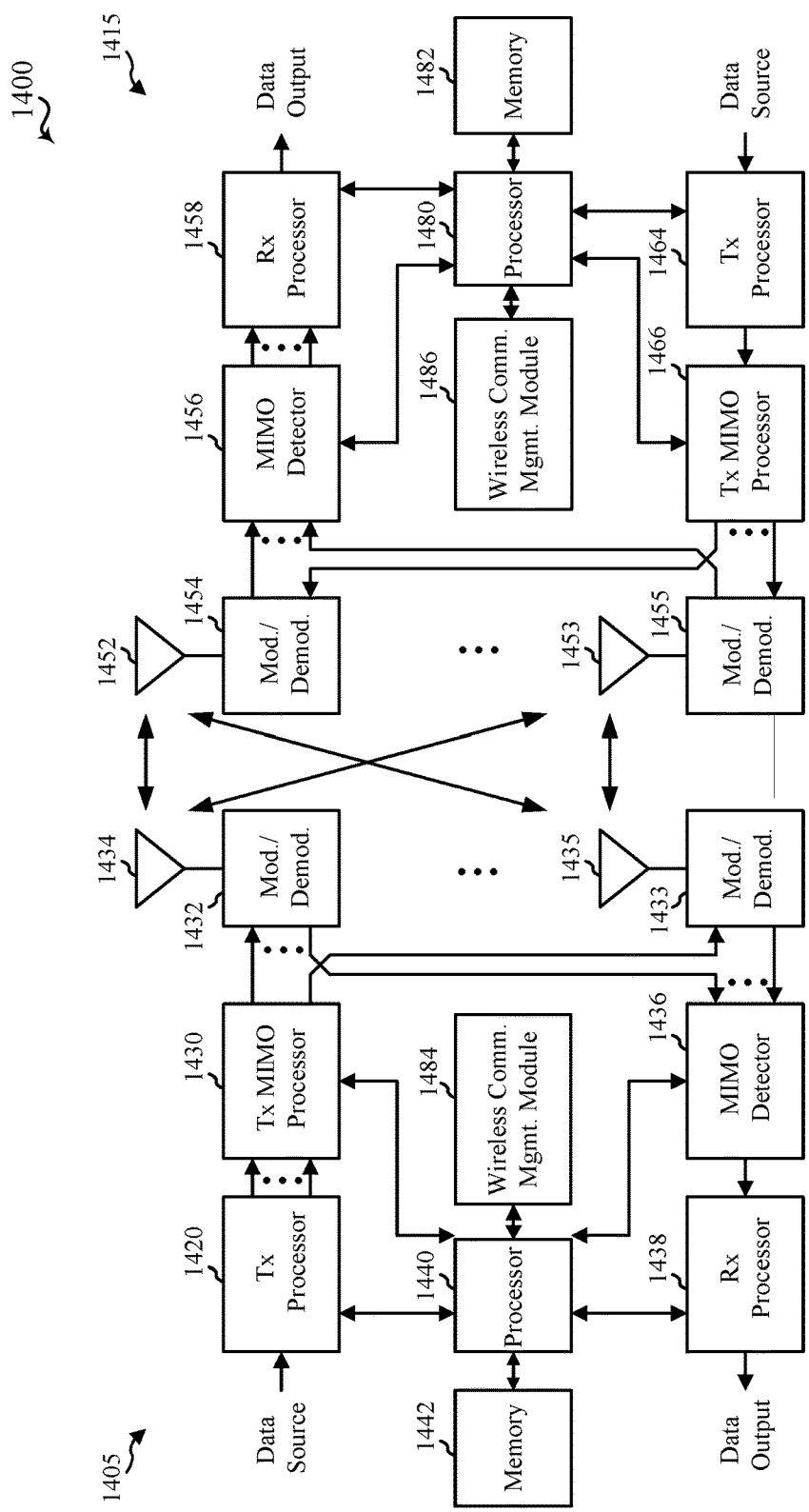
FIG. 14 is a block diagram of a multiple input/multiple output (MIMO) communication system including a base station and a UE, in accordance with various aspects of the present disclosure.

FIG. 14 is a block diagram of a multiple input/multiple output (MIMO) communication system 1400 including a base station 1405 and a UE 1415, in accordance with various aspects of the present disclosure. The MIMO communication system 1400 may illustrate aspects of the wireless communication system 100 and/or 200 described with reference to FIGS. 1 and/or 2. The base station 1405 may be equipped with antennas 1434 through 1435, and the UE 1415 may be equipped with antennas 1452 through 1453. In the MIMO communication system 1400, the base station 1405 may be able to send data over multiple communication links at the same time. Each communication link may be called a "layer" and the "rank" of the communication link may indicate the number of layers used for communication. For example, in a 2×2 MIMO communications system where base station 1405 transmits two "layers," the rank of the communication link between the base station 1405 and the UE 1415 is two.

At the base station 1405, a transmit (Tx) processor 1420 may receive data from a data source. The transmit processor 1420 may process the data. The transmit processor 1420 may also generate control symbols and/or reference symbols. A transmit (Tx) MIMO processor 1430 may perform spatial processing (e.g., precoding) on data symbols, control symbols, and/or reference symbols, if applicable, and may provide output symbol streams to the modulator/demodulator (Mod./Demod.) modules 1432 through 1433. Each modulator/demodulator module 1432 through 1433 may process a respective output symbol stream (e.g., for OFDM, etc.) to obtain an output sample stream. Each modulator/demodulator module 1432 through 1433 may further process (e.g., convert to analog, amplify, filter, and upconvert) the output sample stream to obtain a DL signal. In one example, DL signals from modulator/demodulator modules 1432 through 1433 may be transmitted via the antennas 1434 through 1435, respectively.

At the UE 1415, the UE antennas 1452 through 1453 may receive the DL signals from the base station 1405 and may provide the received signals to the modulator/demodulator (Mod./Demod.) modules 1454 through 1455, respectively. Each modulator/demodulator module 1454 through 1455 may condition (e.g., filter, amplify, downconvert, and digitize) a respective received signal to obtain input samples. Each modulator/demodulator module 1454 through 1455 may further process the input samples (e.g., for OFDM, etc.) to obtain received symbols. A MIMO detector 1456 may obtain received symbols from all the modulator/demodulator modules 1454 through 1455, perform MIMO detection on the received symbols, if applicable, and provide detected symbols. A receive (Rx) processor 1458 may process (e.g., demodulate, deinterleave, and decode) the detected symbols, providing decoded data for the UE 1415 to a data output, and provide decoded control information to a processor 1480, or memory 1482.

The processor 1480 may in some cases execute stored instructions to instantiate a wireless communication management module 1486. The wireless communication management module 1486 may be an example of aspects of the wireless communication management module 820 and/or 920 described with reference to FIGS. 8 and/or 9.

On the uplink (UL), at the UE 1415, a transmit processor 1464 may receive and process data from a data source. The transmit processor 1464 may also generate reference symbols for a reference signal. The symbols from the transmit processor 1464 may be precoded by a transmit MIMO processor 1466 if applicable, further processed by the modulator/demodulator modules 1454 through 1455 (e.g., for SC-FDMA, etc.), and be transmitted to the base station 1405 in accordance with the transmission parameters received from the base station 1405. At the base station 1405, the UL signals from the UE 1415 may be received by the antennas 1434 through 1435, processed by the modulator/demodulator modules 1432 through 1433, detected by a MIMO detector 1436 if applicable, and further processed by a receive processor 1438. The receive processor 1438 may provide decoded data to a data output and to the processor 1440 and/or memory 1442. The processor 1440 may in some cases execute stored instructions to instantiate a wireless communication management module 1484. The wireless communication management module 1484 may be an example of aspects of the wireless communication management module 1020 and/or 1120 described with reference to FIGS. 10 and/or 11.

The components of the UE 1415 may, individually or collectively, be implemented with one or more ASICs adapted to perform some or all of the applicable functions in hardware. Each of the noted modules may be a means for performing one or more functions related to operation of the MIMO communication system 1400. Similarly, the components of the base station 1405 may, individually or collectively, be implemented with one or more ASICs adapted to perform some or all of the applicable functions in hardware. Each of the noted components may be a means for performing one or more functions related to operation of the MIMO communication system 1400.

FIG. 15A is a flow chart illustrating an example of a method 1550 for wireless communication, in accordance with various aspects of the present disclosure. For clarity, the method 1550 is described below with reference to aspects of one or more of the UEs 115, 215, 216, 217, 218, 1215, and/or 1415 described with reference to FIGS. 1, 2, 12, and/or 14, and/or aspects of one or more of the wireless devices 815 and/or 915 described with reference to FIGS. 8 and/or 9. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 1505, the method 1500 may include receiving a first OFDM symbol including a plurality of RSs, which may be cell-specific reference signals (CRSs) or channel state information reference signals (CSI-RSs), over a radio frequency spectrum band. A first portion of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion of the first OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be received over each of the subcarriers of the first OFDM symbol. In some examples, the plurality of RSs may include a plurality of eCRSs. The operation(s) at block 1555 may be performed using the wireless communication management module 820, 920, 1260, and/or 1486 described with reference to FIGS. 8, 9, 12, and/or 14, the RS processing module 835 and/or 935 described with reference to FIGS. 8 and/or 9, and/or the signal processing module 950 described with reference to FIG. 9.

Thus, the method 1500 may provide for wireless communication. It should be noted that the method 1500 is just one implementation and that the operations of the method 1500 may be rearranged or otherwise modified such that other implementations are possible.

Figure 15B:
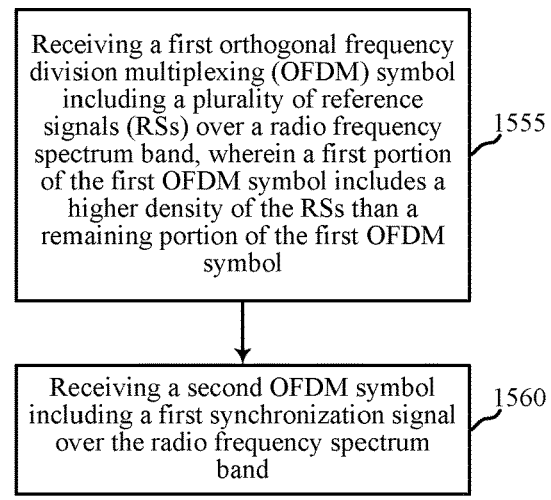
FIG. 15B is a flow chart illustrating an example of a method for wireless communication, in accordance with various aspects of the present disclosure.

FIG. 15B is a flow chart illustrating an example of a method 1550 for wireless communication, in accordance with various aspects of the present disclosure. For clarity, the method 1550 is described below with reference to aspects of one or more of the UEs 115, 215, 216, 217, 218, 1215, and/or 1415 described with reference to FIGS. 1, 2, 12, and/or 14, and/or aspects of one or more of the wireless devices 815 and/or 915 described with reference to FIGS. 8 and/or 9. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 1555, the method 1550 may include receiving a first OFDM symbol including a plurality of RSs, which may be cell-specific reference signals (CRSs) or channel state information reference signals (CSI-RSs), over a radio frequency spectrum band. A first portion of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion of the first OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be received over each of the subcarriers of the first OFDM symbol. In some examples, the plurality of RSs may include a plurality of eCRSs. The operation(s) at block 1555 may be performed using the wireless communication management module 820, 920, 1260, and/or 1486 described with reference to FIGS. 8, 9, 12, and/or 14, the RS processing module 835 and/or 935 described with reference to FIGS. 8 and/or 9, and/or the signal processing module 950 described with reference to FIG. 9.

At block 1560, the method 1560 may include receiving a second OFDM symbol including a first synchronization signal over the radio frequency spectrum band. In some examples, the second OFDM symbol may be adjacent in time to the first OFDM symbol (e.g., the second OFDM symbol may immediately follow the first OFDM symbol in time). In some examples, the first synchronization signal may be associated with a central set of resource blocks of a component carrier of the radio frequency spectrum band (e.g., a center six resource blocks of a component carrier having 100 resource blocks, in which each resource block includes twelve subcarriers). In some examples, the first synchronization signal may be associated with a plurality of subcarriers (e.g., a central set of subcarriers of a component carrier of the radio frequency spectrum band). The operation(s) at block 1560 may be performed using the wireless communication management module 820, 920, 1260, and/or 1486 described with reference to FIGS. 8, 9, 12, and/or 14, the synchronization signal processing module 840 and/or 940 described with reference to FIGS. 8 and/or 9, and/or the signal processing module 950 described with reference to FIG. 9.

In some examples of the method 1550, the radio frequency spectrum band may include an unlicensed radio frequency spectrum band. The unlicensed radio frequency spectrum band may include a radio frequency spectrum band for which apparatuses may need to contend for access because the radio frequency spectrum band is available for unlicensed use, such as Wi-Fi use.

Thus, the method 1550 may provide for wireless communication. It should be noted that the method 1550 is just one implementation and that the operations of the method 1550 may be rearranged or otherwise modified such that other implementations are possible.

Figure 16:
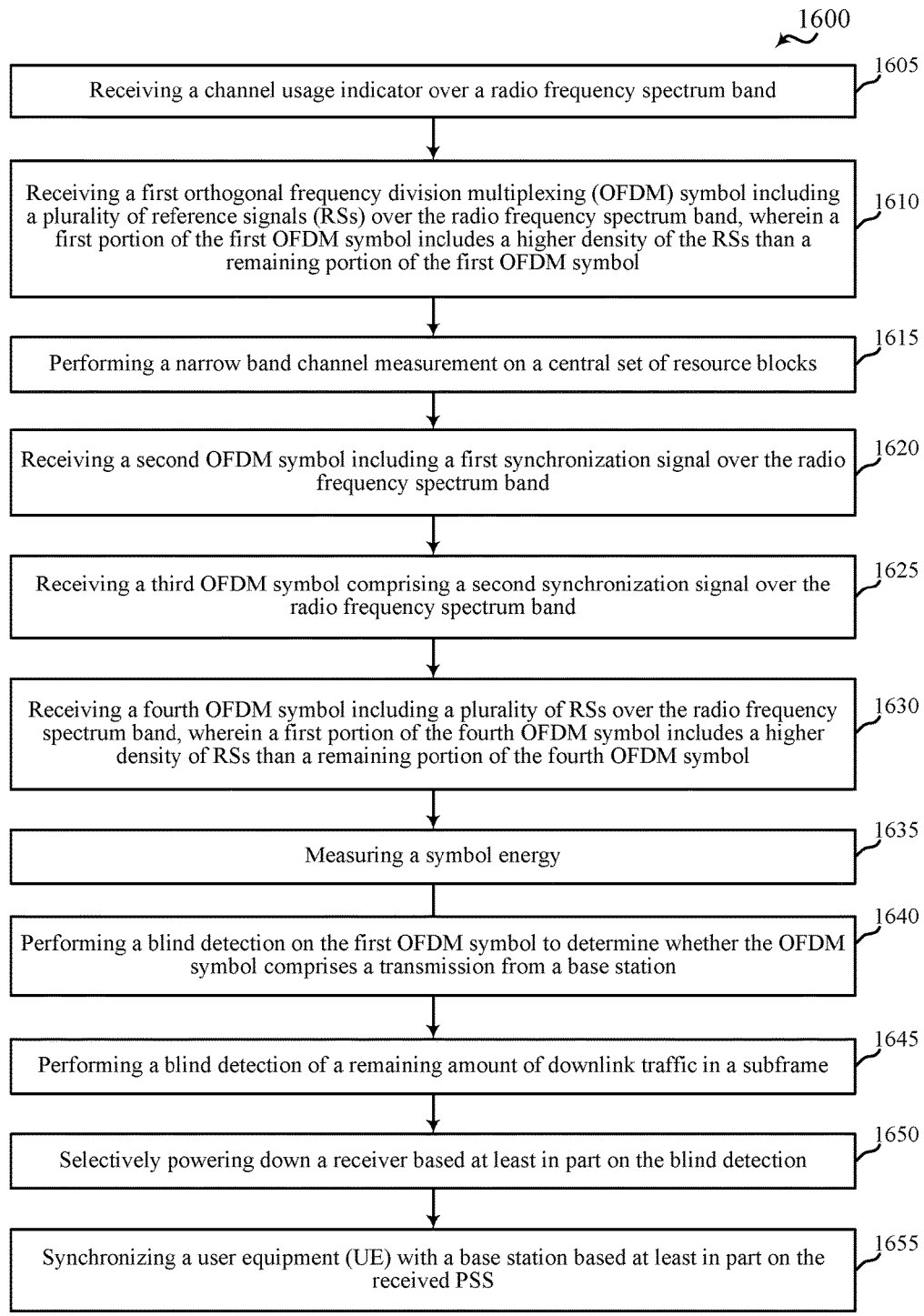
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the UEs 115, 215, 216, 217, 218, 1215, and/or 1415 described with reference to FIGS. 1, 2, 12, and/or 14, and/or aspects of one or more of the wireless devices 815 and/or 915 described with reference to FIGS. 8 and/or 9. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 1605, the method 1600 may include receiving a channel usage indicator over a radio frequency spectrum band. In some examples, the channel usage indicator may include a CUBS. The operation(s) at block 1605 may be performed using the wireless communication management module 820, 920, 1260, and/or 1486 described with reference to FIGS. 8, 9, 12, and/or 14, and/or the channel usage indicator reception management module 945 described with reference to FIG. 9.

At block 1610, the method 1600 may include receiving a first OFDM symbol including a plurality of RSs, which may be cell-specific reference signals (CRSs) or channel state information reference signals (CSI-RSs), over the radio frequency spectrum band. A first portion of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion of the first OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be received over each of the subcarriers of the first OFDM symbol. In some examples, the plurality of RSs may include a plurality of eCRSs. The operation(s) at block 1610 may be performed using the wireless communication management module 820, 920, 1260, and/or 1486 described with reference to FIGS. 8, 9, 12, and/or 14, the RS processing module 835 and/or 935 described with reference to FIGS. 8 and/or 9, and/or the signal processing module 950 described with reference to FIG. 9.

At block 1615, and when the first portion of the first OFDM symbol includes a central set of resource blocks of a component carrier of the radio frequency spectrum band, the method 1600 may include performing a narrow band channel measurement on the central set of resource blocks, where the measurement can be based on all of the RSs from the plurality of RSs, or a subset of RSs from the plurality of RSs. The operation(s) at block 1615 may be performed using the wireless communication management module 820, 920, 1260, and/or 1486 described with reference to FIGS. 8, 9, 12, and/or 14, and/or the channel measurement module 970 described with reference to FIG. 9.

At block 1620, the method 1600 may include receiving a second OFDM symbol including a first synchronization signal over the radio frequency spectrum band. In some examples, the second OFDM symbol may be adjacent in time to the first OFDM symbol (e.g., the second OFDM symbol may immediately follow the first OFDM symbol in time). In some examples, the first synchronization signal may be associated with a central set of resource blocks of a component carrier of the radio frequency spectrum band (e.g., a center six resource blocks of a component carrier having 100 resource blocks, in which each resource block includes twelve subcarriers). In some examples, the first synchronization signal may be associated with a plurality of subcarriers (e.g., a central set of subcarriers of a component carrier of the radio frequency spectrum band). In some examples, the first synchronization signal may include an SSS. In some examples, the SSS may include an eSSS. The operation(s) at block 1620 may be performed using the wireless communication management module 820, 920, 1260, and/or 1486 described with reference to FIGS. 8, 9, 12, and/or 14, the synchronization signal processing module 840 and/or 940 described with reference to FIGS. 8 and/or 9, and/or the signal processing module 950 and/or SSS processing module 955 described with reference to FIG. 9.

At block 1625, the method 1600 may include receiving a third OFDM symbol including a second synchronization signal over the radio frequency band. In some examples, the third OFDM symbol may be adjacent in time to the second OFDM symbol (e.g., the third OFDM symbol may immediately follow the second OFDM symbol in time). In some examples, the second synchronization signal may be associated with a central set of resource blocks of a component carrier of the radio frequency spectrum band (e.g., a center six resource blocks of a component carrier having 100 resource blocks, in which each resource block includes twelve subcarriers). In some examples, the second synchronization signal may be associated with a plurality of subcarriers (e.g., a central set of subcarriers of a component carrier of the radio frequency spectrum band). In some examples, the second synchronization signal may include a PSS. In some examples, the PSS may include an ePSS. The operation(s) at block 1625 may be performed using the wireless communication management module 820, 920, 1260, and/or 1486 described with reference to FIGS. 8, 9, 12, and/or 14, the synchronization signal processing module 840 and/or 940 described with reference to FIGS. 8 and/or 9, and/or the signal processing module 950 and/or PSS processing module 960 described with reference to FIG. 9.

In some examples, the first synchronization signal and the second synchronization signal may be received over the same antenna port. In some examples, the first synchronization signal and/or the second synchronization signal may be received over the same antenna port as the plurality of RSs. In some examples, each of the second OFDM symbol and the third OFDM symbol may further include at least one of a CSI-RS, a SIB, a PBCH, or a combination thereof. In some examples, the SIB may include an eSIB and/or the PBCH may include an ePBCH. In some examples, an RS or embedded user equipment-specific reference signal (UE-RS) may provide a phase reference for the PBCH.

At block 1630, the method 1600 may include receiving a fourth OFDM symbol including a plurality of RSs over the radio frequency spectrum band. A first portion of the fourth OFDM symbol may include a higher density of RSs than a remaining portion of the fourth OFDM symbol. In some examples, the fourth OFDM symbol may be adjacent in time to the third OFDM symbol (e.g., the fourth OFDM symbol may immediately follow the third OFDM symbol in time). In some examples, the first portion of the fourth OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be received over each of the subcarriers of the first OFDM symbol. In some examples, the resource blocks and/or subcarriers included in the first portion of the first OFDM symbol may be the same resource blocks and/or subcarriers included in the first portion of the fourth OFDM symbol. In some examples, the plurality of RSs may include a plurality of eCRSs. The operation(s) at block 1630 may be performed using the wireless communication management module 820, 920, 1260, and/or 1486 described with reference to FIGS. 8, 9, 12, and/or 14, the RS processing module 835 and/or 935 described with reference to FIGS. 8 and/or 9, and/or the signal processing module 950 described with reference to FIG. 9.

In some examples, the first OFDM symbol and/or the fourth OFDM symbol may further include at least one of a PDCCH, a PDSCH, and/or a PMCH. In some examples, the PDCCH may include an ePDCCH, the PDSCH may include an ePDSCH, and/or the PMCH may include an ePMCH.

In some examples, the first OFDM symbol, the second OFDM symbol, the third OFDM symbol, and the fourth OFDM symbol may be respectively received, at blocks 1610, 1620, 1625, and 1630, as the first OFDM symbol, the second OFDM symbol, the third OFDM symbol, and the fourth OFDM symbol of a subframe having fourteen OFDM symbols. In some examples, the eighth OFDM symbol and the eleventh OFDM symbol of the subframe may be configured similarly to the first OFDM symbol and the fourth OFDM symbol. In some examples of the method, a PDCCH, a PDSCH, and/or a PMCH may be received during the fifth OFDM symbol, the sixth OFDM symbol, the seventh OFDM symbol, the ninth OFDM symbol, the tenth OFDM symbol, the twelfth OFDM symbol, the thirteenth OFDM symbol, and/or the fourteenth OFDM symbol of the subframe. In some examples, the PDCCH may include an ePDCCH, the PDSCH may include an ePDSCH, and/or the PMCH may include an ePMCH. In some examples, the OFDM symbols received as part of the method 1600 may be received during the first subframe and/or the sixth subframe of a radio frame having ten subframes.

In some examples, the method 1600 may include determining a base station parameter based at least in part on the received pluralities of RSs. The base station parameter may include, for example, a PCI of the base station, a current subframe number of the base station, or a combination thereof.

At block 1635, the method 1600 may include measuring a symbol energy. At block 1640, the method 1600 may include performing a blind detection on the first OFDM symbol to determine whether the OFDM symbol comprises a transmission from a base station. At block 1645, the method 1600 may include performing a blind detection of a remaining amount of downlink traffic in a subframe (e.g., a remaining amount of downlink traffic in a subframe in which the first OFDM symbol, the second OFDM symbol, the third OFDM symbol, and/or the fourth OFDM symbol are received). In some examples, the remaining amount of downlink traffic may be a remaining amount of downlink traffic following the fourth OFDM symbol (or in embodiments of the method in which the third OFDM symbol and/or fourth OFDM symbol are not transmitted or received, the remaining amount of downlink traffic may be a remaining amount of downlink traffic following the second OFDM symbol or the third OFDM symbol). In some examples, the blind detection may be based at least in part on the measured symbol energy. In some examples, the blind detection may be based at least in part on a first plurality of CSI-RSs received in the second OFDM symbol (e.g., CSI-RSs received in the same OFDM symbol as the first synchronization signal) and/or a second plurality of CSI-RSs received in the third OFDM symbol (e.g., CSI-RSs received in the same OFDM symbol as the second synchronization signal). The operation(s) at block 1635, 1640 and/or 1645 may be performed using the wireless communication management module 820, 920, 1260, and/or 1486 described with reference to FIGS. 8, 9, 12, and/or 14, and/or the traffic detection module 975 described with reference to FIG. 9.

At block 1650, the method 1600 may include selectively powering down a receiver based at least in part on the blind detection performed at block 1645. In some examples, the receiver may be powered down when the detected remaining amount of downlink traffic in the subframe fails to satisfy a threshold. The operation(s) at block 1650 may be performed using the wireless communication management module 820, 920, 1260, and/or 1486 described with reference to FIGS. 8, 9, 12, and/or 14, and/or the power management module 980 described with reference to FIG. 9.

At block 1655, the method 1600 may include synchronizing a UE (e.g., a UE performing the method 1600) with a base station based at least in part on the received first synchronization signal and/or the received second synchronization signal. In some examples, the synchronizing may include performing a cross-correlation of samples of the first synchronization signal and the second synchronization signal, and recovering a timing of the base station based at least in part on the cross-correlation of the samples. The operation(s) at block 1655 may be performed using the wireless communication management module 820, 920, 1260, and/or 1486 described with reference to FIGS. 8, 9, 12, and/or 14, and/or the synchronization signal processing module 940 and/or cross-correlation and timing recovery module 965 described with reference to FIG. 9.

In some examples of the method 1600, the radio frequency spectrum band may include an unlicensed radio frequency spectrum band. The unlicensed radio frequency spectrum band may include a radio frequency spectrum band for which apparatuses may need to contend for access because the radio frequency spectrum band is available for unlicensed use, such as Wi-Fi use.

Thus, the method 1600 may provide for wireless communication. It should be noted that the method 1600 is just one implementation and that the operations of the method 1600 may be rearranged or otherwise modified such that other implementations are possible.

In some examples, aspects of one or more of the methods 1500, 1550, and/or 1600 described with reference to FIGS. 15A, 15B, and/or 16 may be combined.

FIG. 17A is a flow chart illustrating an example of a method 1700 for wireless communication, in accordance with various aspects of the present disclosure. For clarity, the method 1700 is described below with reference to aspects of one or more of the base stations 105, 205, 206, 1305, and/or 1405 described with reference to FIGS. 1, 2, 13, and/or 14, and/or aspects of one or more of the wireless devices 1005 and/or 1105 described with reference to FIGS. 10 and/or 11. In some examples, a base station or wireless device may execute one or more sets of codes to control the functional elements of the base station or wireless device to perform the functions described below. Additionally or alternatively, the base station or wireless device may perform one or more of the functions described below using special-purpose hardware.

At block 1705, the method 1700 may include transmitting a first OFDM symbol including a plurality of RSs, which may be cell-specific reference signals (CRSs) or channel state information reference signals (CSI-RSs), over a radio frequency spectrum band. A first portion of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion of the first OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be transmitted over each of the subcarriers of the first OFDM symbol. In some examples, the radio frequency spectrum band may include an unlicensed radio frequency spectrum band. In some examples, the unlicensed radio frequency spectrum band may include a radio frequency spectrum band for which apparatuses may need to contend for access because the radio frequency spectrum band is available for unlicensed use, such as Wi-Fi use. In some examples, the plurality of RSs may include a plurality of eCRSs. The operation(s) at block 1705 may be performed using the wireless communication management module 1020, 1120, 1360, and/or 1484 described with reference to FIGS. 10, 11, 13, and/or 14, the RS formatting module 1035 and/or 1135 described with reference to FIGS. 10 and/or 11, and/or the signal formatting module 1155 described with reference to FIG. 11.

Thus, the method 1700 may provide for wireless communication. It should be noted that the method 1700 is just one implementation and that the operations of the method 1700 may be rearranged or otherwise modified such that other implementations are possible.

Figure 17B:
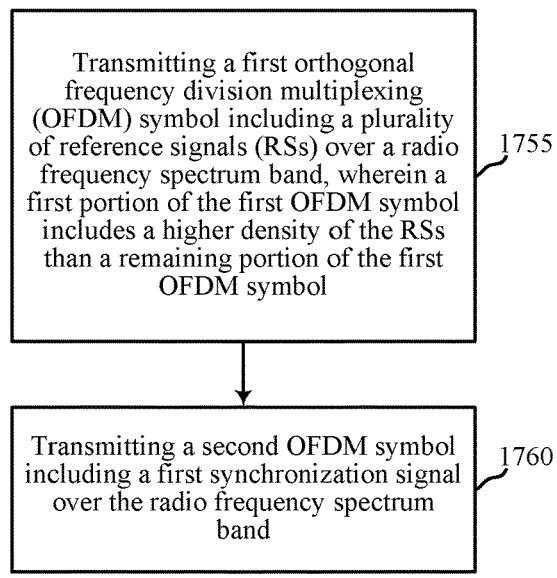
FIG. 17B is a flow chart illustrating an example of a method for wireless communication, in accordance with various aspects of the present disclosure.

FIG. 17B is a flow chart illustrating an example of a method 1750 for wireless communication, in accordance with various aspects of the present disclosure. For clarity, the method 1750 is described below with reference to aspects of one or more of the base stations 105, 205, 206, 1305, and/or 1405 described with reference to FIGS. 1, 2, 13, and/or 14, and/or aspects of one or more of the wireless devices 1005 and/or 1105 described with reference to FIGS. 10 and/or 11. In some examples, a base station or wireless device may execute one or more sets of codes to control the functional elements of the base station or wireless device to perform the functions described below. Additionally or alternatively, the base station or wireless device may perform one or more of the functions described below using special-purpose hardware.

At block 1755, the method 1750 may include transmitting a first OFDM symbol including a plurality of RSs, which may be cell-specific reference signals (CRSs) or channel state information reference signals (CSI-RSs), over a radio frequency spectrum band. A first portion of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion of the first OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be transmitted over each of the subcarriers of the first OFDM symbol. In some examples, the plurality of RSs may include a plurality of eCRSs. The operation(s) at block 1755 may be performed using the wireless communication management module 1020, 1120, 1360, and/or 1484 described with reference to FIGS. 10, 11, 13, and/or 14, the RS formatting module 1035 and/or 1135 described with reference to FIGS. 10 and/or 11, and/or the signal formatting module 1155 described with reference to FIG. 11.

At block 1760, the method 1750 may include transmitting a second OFDM symbol including a first synchronization signal over the radio frequency spectrum band. In some examples, the second OFDM symbol may be adjacent in time to the first OFDM symbol (e.g., the second OFDM symbol may immediately follow the first OFDM symbol in time). The operation(s) at block 1510 may be performed using the wireless communication management module 1020, 1120, 1360, and/or 1484 described with reference to FIGS. 10, 11, 13, and/or 14, the synchronization signal formatting module 1040 and/or 1140 described with reference to FIGS. 10 and/or 11, and/or the signal formatting module 1155 described with reference to FIG. 11.

In some examples of the method 1750, the radio frequency spectrum band may include an unlicensed radio frequency spectrum band. The unlicensed radio frequency spectrum band may include a radio frequency spectrum band for which apparatuses may need to contend for access because the radio frequency spectrum band is available for unlicensed use, such as Wi-Fi use.

Thus, the method 1750 may provide for wireless communication. It should be noted that the method 1750 is just one implementation and that the operations of the method 1750 may be rearranged or otherwise modified such that other implementations are possible.

Figure 18:
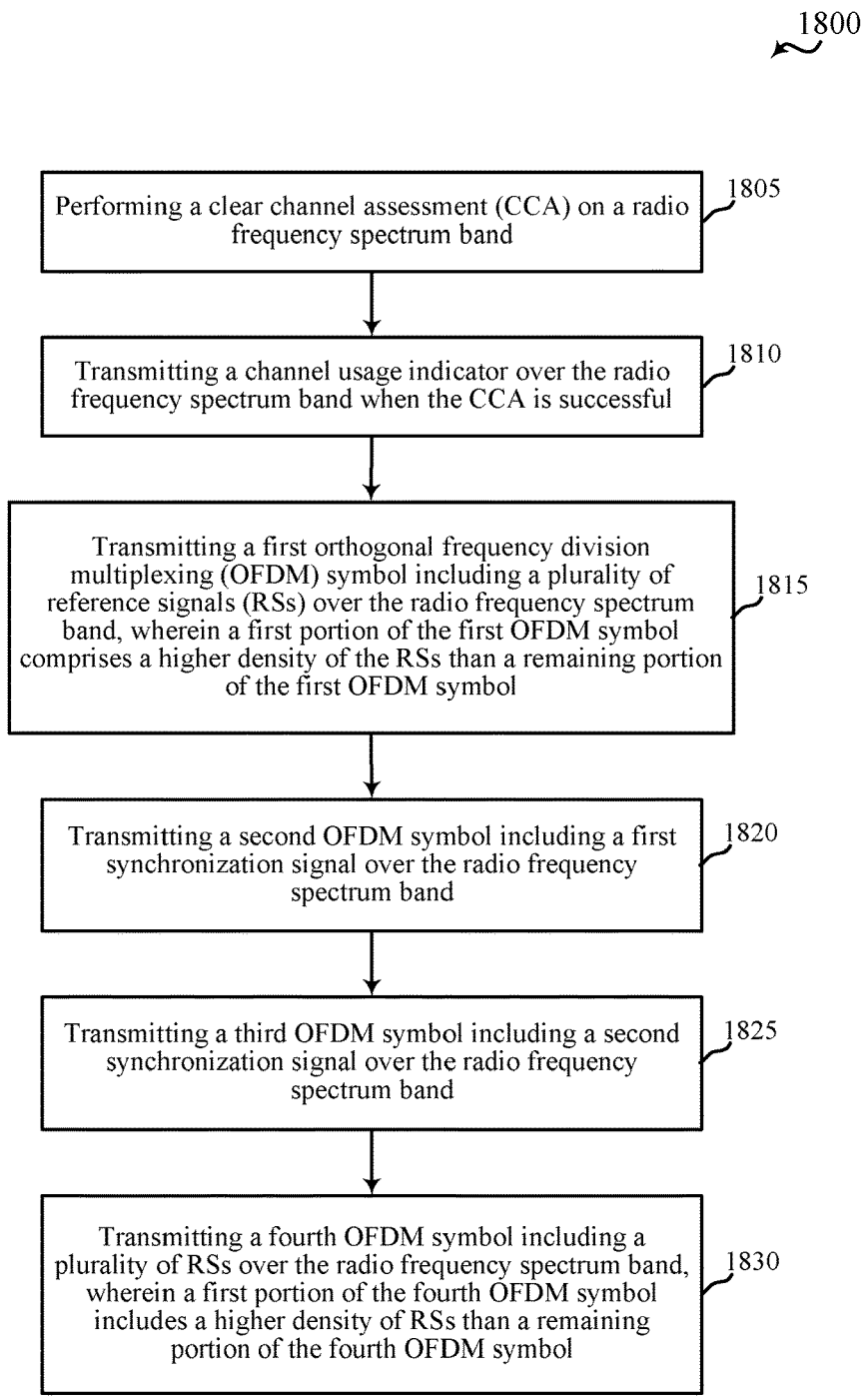
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the UEs 115, 215, 216, 217, 218, 1215, and/or 1415 described with reference to FIGS. 1, 2, 12, and/or 14, and/or aspects of one or more of the wireless devices 815 and/or 915 described with reference to FIGS. 8 and/or 9. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 1805, the method 1800 may include performing a CCA on a radio frequency spectrum band. The operation(s) at block 1805 may be performed using the wireless communication management module 1020, 1120, 1360, and/or 1484 described with reference to FIGS. 10, 11, 13, and/or 14, and/or the CCA module 1145 described with reference to FIG. 11.

At block 1810, the method 1800 may include transmitting a channel usage indicator over the radio frequency spectrum band when the CCA is successful. In some examples, the channel usage indicator may include a CUBS. The operation(s) at block 1810 may be performed using the wireless communication management module 1020, 1120, 1360, and/or 1484 described with reference to FIGS. 10, 11, 13, and/or 14, and/or the channel usage indicator transmission management module 1150 described with reference to FIG. 11.

At block 1815, the method 1800 may include transmitting a first OFDM symbol including a plurality of RSs, which may be cell-specific reference signals (CRSs) or channel state information reference signals (CSI-RSs), over the radio frequency spectrum band. A first portion of the first OFDM symbol may include a higher density of the RSs than a remaining portion of the first OFDM symbol. In some cases, the higher density may provide enough tones for a UE to perform a narrow band measurement, where the measurement can be based on all of the RSs from the plurality of RSs, or a subset of RSs from the plurality of RSs. In some examples, the first portion of the first OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be transmitted over each of the subcarriers of the first OFDM symbol. In some examples, the plurality of RSs may include a plurality of eCRSs. The operation(s) at block 1815 may be performed using the wireless communication management module 1020, 1120, 1360, and/or 1484 described with reference to FIGS. 10, 11, 13, and/or 14, the RS formatting module 1035 and/or 1135 described with reference to FIGS. 10 and/or 11, and/or the signal formatting module 1155 described with reference to FIG. 11.

At block 1820, the method 1800 may include transmitting a second OFDM symbol including a first synchronization signal over the radio frequency spectrum band. In some examples, the second OFDM symbol may be adjacent in time to the first OFDM symbol (e.g., the second OFDM symbol may immediately follow the first OFDM symbol in time). In some examples, the first synchronization signal may be associated with a central set of resource blocks of a component carrier of the radio frequency spectrum band (e.g., a center six resource blocks of a component carrier having 100 resource blocks, in which each resource block includes twelve subcarriers). In some examples, the first synchronization signal may be associated with a plurality of subcarriers (e.g., a central set of subcarriers of a component carrier of the radio frequency spectrum band). In some examples, the first synchronization signal may include an SSS. In some examples, the SSS may include an eSSS. The operation(s) at block 1820 may be performed using the wireless communication management module 1020, 1120, 1360, and/or 1484 described with reference to FIGS. 10, 11, 13, and/or 14, the synchronization signal formatting module 1040 and/or 1140 described with reference to FIGS. 10 and/or 11, and/or the signal formatting module 1155 and/or SSS formatting module 1160 described with reference to FIG. 11.

At block 1825, the method 1800 may include transmitting a third OFDM symbol including a second synchronization signal over the radio frequency band. In some examples, the third OFDM symbol may be adjacent in time to the second OFDM symbol (e.g., the third OFDM symbol may immediately follow the second OFDM symbol in time). In some examples, the second synchronization signal may be associated with a central set of resource blocks of a component carrier of the radio frequency spectrum band (e.g., a center six resource blocks of a component carrier having 100 resource blocks, in which each resource block includes twelve subcarriers). In some examples, the second synchronization signal may be associated with a plurality of subcarriers (e.g., a central set of subcarriers of a component carrier of the radio frequency spectrum band). In some examples, the second synchronization signal may include a PSS. In some examples, the PSS may include an ePSS. The operation(s) at block 1825 may be performed using the wireless communication management module 1020, 1120, 1360, and/or 1484 described with reference to FIGS. 10, 11, 13, and/or 14, the synchronization signal formatting module 1040 and/or 1140 described with reference to FIGS. 10 and/or 11, and/or the signal formatting module 1155 and/or PSS formatting module 1165 described with reference to FIG. 11.

In some examples, the first synchronization signal and the second synchronization signal may be transmitted over the same antenna port. In some examples, the first synchronization signal and/or the second synchronization signal may be transmitted over the same antenna port as the plurality of RSs. In some examples, each of the second OFDM symbol and the third OFDM symbol may further include at least one of a CSI-RS, a SIB, a PBCH, or a combination thereof. In some examples, the SIB may include an eSIB and/or the PBCH may include an ePBCH. In some examples, an RS or embedded user equipment-specific reference signal (UE-RS) may provide a phase reference for the PBCH.

At block 1830, the method 1800 may include transmitting a fourth OFDM symbol including a plurality of RSs over the radio frequency spectrum band. A first portion of the fourth OFDM symbol may include a higher density of RSs than a remaining portion of the fourth OFDM symbol. In some examples, the fourth OFDM symbol may be adjacent in time to the third OFDM symbol (e.g., the fourth OFDM symbol may immediately follow the third OFDM symbol in time). In some examples, the first portion of the fourth OFDM symbol may include a central set of resource blocks of a component carrier of the radio frequency spectrum band (e.g., a center six resource blocks of a component carrier having 100 resource blocks, in which each resource block includes twelve subcarriers). In some examples, the first portion of the first OFDM symbol may be associated with a plurality of subcarriers (e.g., a central set of subcarriers of a component carrier of the radio frequency spectrum band). In some examples, an RS may be transmitted over each of the subcarriers of the first OFDM symbol. In some examples, the resource blocks and/or subcarriers included in the first portion of the first OFDM symbol may be the same resource blocks and/or subcarriers included in the first portion of the fourth OFDM symbol. In some examples, the plurality of RSs may include a plurality of eCRSs. The operation(s) at block 1830 may be performed using the wireless communication management module 1020, 1120, 1360, and/or 1484 described with reference to FIGS. 10, 11, 13, and/or 14, the RS formatting module 1035 and/or 1135 described with reference to FIGS. 10 and/or 11, and/or the signal formatting module 1155 described with reference to FIG. 11.

In some examples, the first OFDM symbol and/or the fourth OFDM symbol may further include at least one of a PDCCH, a PDSCH, and/or a PMCH. In some examples, the PDCCH may include an ePDCCH, the PDSCH may include an ePDSCH, and/or the PMCH may include an ePMCH.

In some examples, the first OFDM symbol, the second OFDM symbol, the third OFDM symbol, and the fourth OFDM symbol may be respectively transmitted, at blocks 1810, 1820, 1825, and 1830, as the first OFDM symbol, the second OFDM symbol, the third OFDM symbol, and the fourth OFDM symbol of a subframe having fourteen OFDM symbols. In some examples, the eighth OFDM symbol and the eleventh OFDM symbol of the subframe may be configured similarly to the first OFDM symbol and the fourth OFDM symbol. In some examples of the method, a PDCCH, a PDSCH, and/or a PMCH may be transmitted during the fifth OFDM symbol, the sixth OFDM symbol, the seventh OFDM symbol, the ninth OFDM symbol, the tenth OFDM symbol, the twelfth OFDM symbol, the thirteenth OFDM symbol, and/or the fourteenth OFDM symbol of the subframe. In some examples, the PDCCH may include an ePDCCH, the PDSCH may include an ePDSCH, and/or the PMCH may include an ePMCH. In some examples, the OFDM symbols transmitted as part of the method 1800 may be transmitted during the first subframe and/or the sixth subframe of a radio frame having ten subframes.

In some examples of the method 1800, the radio frequency spectrum band may include an unlicensed radio frequency spectrum band. The unlicensed radio frequency spectrum band may include a radio frequency spectrum band for which apparatuses may need to contend for access because the radio frequency spectrum band is available for unlicensed use, such as Wi-Fi use.

Thus, the method 1800 may provide for wireless communication. It should be noted that the method 1800 is just one implementation and that the operations of the method 1800 may be rearranged or otherwise modified such that other implementations are possible.

In some examples, aspects of one or more of the methods 1700, 1750, and/or 1800 described with reference to FIGS. 17A, 17B, and/or 18 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:
1. A method for wireless communication, comprising:
receiving, by a wireless device, and based at least in part on a successful clear channel assessment (CCA), a first orthogonal frequency division multiplexing (OFDM) symbol comprising a plurality of reference signals (RSs) over a radio frequency spectrum band, wherein a first portion of the first OFDM symbol comprises a higher density of the RSs than a remaining portion of the first OFDM symbol;
determining that the first OFDM symbol comprises a transmission from a base station; and
performing a narrow band measurement based at least in part on the receiving and the determining.

2. The method of claim 1, wherein the plurality of RSs include at least one of a cell-specific reference signal (CRS) or a channel state information reference signal (CSI-RS).

3. The method of claim 1, further comprising:
receiving a second OFDM symbol comprising a first synchronization signal over the radio frequency spectrum band.

4. The method of claim 3, wherein the second OFDM symbol is adjacent in time to the first OFDM symbol.

5. The method of claim 3, further comprising:
receiving a third OFDM symbol comprising a second synchronization signal over the radio frequency spectrum band.

6. The method of claim 5, wherein the third OFDM symbol is adjacent in time to the second OFDM symbol.

7. The method of claim 5, further comprising:
receiving a fourth OFDM symbol comprising a plurality of RSs over the radio frequency spectrum band, wherein a first portion of the fourth OFDM symbol comprises a higher density of RSs than a remaining portion of the fourth OFDM symbol.

8. The method of claim 7, wherein the fourth OFDM symbol is adjacent in time to the third OFDM symbol.

9. The method of claim 7, wherein the radio frequency spectrum band comprises an unlicensed radio frequency spectrum band.

10. The method of claim 5, wherein each of the second OFDM symbol and the third OFDM symbol further comprises at least one of a group consisting of:
a channel state information reference signal (CSI-RS), a service information block (SIB), a physical broadcast channel (PBCH), and combinations thereof.

11. The method of claim 5, wherein the first synchronization signal comprises a secondary synchronization signal and the second synchronization signal comprises a primary synchronization signal.

12. The method of claim 5, wherein the first synchronization signal and the second synchronization signal are received over a central set of resource blocks of the second OFDM symbol and the third OFDM symbol.

13. The method of claim 3, further comprising:
performing a blind detection of a remaining amount of downlink traffic in a subframe.

14. The method of claim 13, further comprising:
selectively powering down a receiver based at least in part on the blind detection.

15. The method of claim 13, wherein the blind detection is based at least in part on a first plurality of channel state information reference signals (CSI-RSs) received in the second OFDM symbol.

16. The method of claim 15, wherein the blind detection is further based at least in part on a second plurality of CSI-RSs received in an OFDM symbol associated with a second synchronization signal.

17. The method of claim 13, further comprising:
measuring a symbol energy;
wherein the blind detection is based at least in part on the symbol energy.

18. The method of claim 1, wherein the first portion of the first OFDM symbol comprises a central set of resource blocks of a component carrier of the radio frequency spectrum band.

19. The method of claim 18, wherein the narrow band channel measurement is performed on the central set of resource blocks.

20. The method of claim 19, wherein the narrow band measurement is based on all of the RSs from the plurality of RSs, or a subset of RSs from the plurality of RSs.

21. The method of claim 1, further comprising:
performing a blind detection on the first OFDM symbol to determine whether the OFDM symbol comprises a transmission from a base station.

22. The method of claim 1, wherein the first portion of the first OFDM symbol is associated with a plurality of subcarriers and an RS is received over each of the plurality of subcarriers of the first OFDM symbol.

23. An apparatus for wireless communication, comprising:
means for receiving, by the apparatus, and based at least in part on a successful clear channel assessment (CCA), a first orthogonal frequency division multiplexing (OFDM), symbol comprising a plurality of reference signals (RSs) over a radio frequency spectrum band, wherein a first portion of the first OFDM symbol comprises a higher density of the RSs than a remaining portion of the first OFDM symbol;
means for discovering a base station based at least in part on the receiving; and
means for performing a narrow band measurement based at least in part on the receiving and the determining.

24. The apparatus of claim 23, wherein the plurality of RSs include at least one of a cell-specific reference signal (CRS) or a channel state information reference signal (CSI-RS).

25. The apparatus of claim 23, further comprising:
means for receiving a second OFDM symbol comprising a first synchronization signal over the radio frequency spectrum band.

26. The apparatus of claim 25, wherein the second OFDM symbol is adjacent in time to the first OFDM symbol.

27. The apparatus of claim 25, further comprising:
means for receiving a third OFDM symbol comprising a second synchronization signal over the unlicensed radio frequency spectrum band.

28. The apparatus of claim 27, wherein the third OFDM symbol is adjacent in time to the second OFDM symbol.

29. The apparatus of claim 27, further comprising:
means for receiving a fourth OFDM symbol comprising a plurality of RSs over the radio frequency spectrum band, wherein a first portion of the fourth OFDM symbol comprises a higher density of RSs than a remaining portion of the fourth OFDM symbol.

30. The apparatus of claim 29, wherein the fourth OFDM symbol is adjacent in time to the third OFDM symbol.

31. The method of claim 29, wherein the radio frequency spectrum band comprises an unlicensed radio frequency spectrum band.

32. The apparatus of claim 27, wherein each of the second OFDM symbol and the third OFDM symbol further comprises at least one of a group consisting of:
a channel state information reference signal (CSI-RS), a service information block (SIB), a physical broadcast channel (PBCH), and combinations thereof.

33. The apparatus of claim 27, wherein the first synchronization signal comprises a secondary synchronization signal and the second synchronization signal comprises a primary synchronization signal.

34. The apparatus of claim 27, wherein the first synchronization signal and the second synchronization signal are received over a central set of resource blocks of the second OFDM symbol and the third OFDM symbol.

35. The apparatus of claim 23, wherein the first portion of the first OFDM symbol comprises a central set of resource blocks of a component carrier of the radio frequency spectrum band.

36. The apparatus of claim 35, wherein the narrow band channel measurement is performed on the central set of resource blocks.

37. The apparatus of claim 36, wherein the narrow band measurement is based on all of the RSs from the plurality of RSs, or a subset of RSs from the plurality of RSs.

38. The apparatus of claim 23, further comprising:
means for performing a blind detection on the first OFDM symbol to determine whether the OFDM symbol comprises a transmission from a base station.

39. The apparatus of claim 25, further comprising:
means for performing a blind detection of a remaining amount of downlink traffic in a subframe.

40. The apparatus of claim 39, further comprising:
means for selectively powering down a receiver based at least in part on the blind detection.

41. The apparatus of claim 39, wherein the blind detection is based at least in part on a first plurality of channel state information reference signals (CSI-RSs) received in the second OFDM symbol.

42. The apparatus of claim 41, wherein the blind detection is further based at least in part on a second plurality of CSI-RSs received in an OFDM symbol associated with a second synchronization signal.

43. The apparatus of claim 39, further comprising:
means for measuring a symbol energy;
wherein the blind detection is based at least in part on the symbol energy.

44. The apparatus of claim 23, wherein the first portion of the first OFDM symbol is associated with a plurality of subcarriers and an RS is received over each of the plurality of subcarriers of the first OFDM symbol.

45. An apparatus for wireless communication, comprising:
a processor; and
memory coupled to the processor, wherein the processor is configured to:
receive, by the apparatus, and based at least in part on a successful clear channel assessment (CCA), a first orthogonal frequency division multiplexing (OFDM) symbol comprising a plurality of reference signals (RSs) over a radio frequency spectrum band, wherein a first portion of the first OFDM symbol comprises a higher density of the RSs than a remaining portion of the first OFDM symbol;
determine that the first OFDM symbol comprises a transmission from a base station; and
perform a narrow band measurement based at least in part on the receiving and the determining.

46. The apparatus of claim 45, wherein the plurality of RSs include at least one of a cell-specific reference signal (CRS) or a channel state information reference signal (CSI-RS).

47. The apparatus of claim 45, wherein the processor is configured to:
receive a second OFDM symbol comprising a first synchronization signal over the radio frequency spectrum band.

48. The apparatus of claim 47, wherein the processor is configured to:
receive a third OFDM symbol comprising a second synchronization signal over the radio frequency spectrum band.

49. The apparatus of claim 48, wherein the processor is configured to:
receive a fourth OFDM symbol comprising a plurality of RSs over the radio frequency spectrum band, wherein a first portion of the fourth OFDM symbol comprises a higher density of RSs than a remaining portion of the fourth OFDM symbol.

50. The apparatus of claim 48, wherein the first synchronization signal and the second synchronization signal are received over a central set of resource blocks of the second OFDM symbol and the third OFDM symbol.

51. The apparatus of claim 45, wherein the first portion of the first OFDM symbol comprises a central set of resource blocks of a component carrier of the radio frequency spectrum band.

52. The apparatus of claim 45, wherein the processor is configured to:
perform a blind detection on the first OFDM symbol to determine whether the OFDM symbol comprises a transmission from a base station.

53. The apparatus of claim 46, wherein the processor is configured to:
perform a blind detection of a remaining amount of downlink traffic in a subframe.

54. The apparatus of claim 53, wherein the processor is configured to:
selectively power down a receiver based at least in part on the blind detection.

55. A non-transitory computer-readable medium for storing instructions executable by a processor, comprising:
instructions to receive, by a wireless device, and based at least in part on a successful clear channel assessment (CCA), a first orthogonal frequency division multiplexing (OFDM) symbol comprising a plurality of reference signals (RSs) over a radio frequency spectrum band, wherein a first portion of the first OFDM symbol comprises a higher density of the RSs than a remaining portion of the first OFDM symbol;
instructions to determine that the first OFDM symbol comprises a transmission from a base station; and
instructions to perform a narrow band measurement based at least in part on the receiving and the determining.

56. The non-transitory computer-readable medium of claim 55, wherein the plurality of RSs include at least one of a cell-specific reference signal (CRS) or a channel state information reference signal (CSI-RS).

57. The non-transitory computer-readable medium of claim 55, further comprising:
instructions to receive a second OFDM symbol comprising a first synchronization signal over the radio frequency spectrum band.

58. The non-transitory computer-readable medium of claim 57, further comprising:
instructions to receive a third OFDM symbol comprising a second synchronization signal over the radio frequency spectrum band.

59. The non-transitory computer-readable medium of claim 58, further comprising:
   instructions to receive a fourth OFDM symbol comprising a plurality of RSs over the radio frequency spectrum band, wherein a first portion of the fourth OFDM symbol comprises a higher density of RSs than a remaining portion of the fourth OFDM symbol.

60. The method of claim 1, further comprising:
   performing a blind detection on the first OFDM symbol, wherein the determining is based at least in part on the performing.

* * * * *